(12) United States Patent
Mehta et al.

(10) Patent No.: US 7,619,038 B2
(45) Date of Patent: Nov. 17, 2009

(54) HOMOGENEOUS POLYMER BLEND AND ARTICLES THEREFROM

(75) Inventors: Aspy K. Mehta, Humble, TX (US); Chia Cheng, Seabrook, TX (US); Sudhin Datta, Houston, TX (US); Wen Li, Houston, TX (US); Chon Y. Lin, Houston, TX (US); Srivatsan S. Iyer, Pearland, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 546 days.

(21) Appl. No.: 11/299,022

(22) Filed: Dec. 9, 2005

(65) Prior Publication Data

US 2006/0183860 A1  Aug. 17, 2006

Related U.S. Application Data

(60) Provisional application No. 60/655,612, filed on Feb. 22, 2005, provisional application No. 60/655,310, filed on Feb. 22, 2005, provisional application No. 60/637,429, filed on Dec. 17, 2004.

(51) Int. Cl.
C08L 23/10 (2006.01)
C08L 23/14 (2006.01)

(52) U.S. Cl. .................. 525/191; 525/240; 524/515

(58) Field of Classification Search .............. 540/191, 540/240; 524/515
See application file for complete search history.

(56) References Cited

U.S. PATENT DOCUMENTS

| | | | |
|---|---|---|---|
| 3,262,992 A | 7/1966 | Holzer et al. |
| 3,378,606 A | 4/1968 | Kontos |
| 3,853,969 A | 12/1974 | Kontos |
| 3,882,197 A | 5/1975 | Fritz et al. |
| 3,888,949 A | 6/1975 | Shih |
| 4,461,872 A | 7/1984 | Su |
| 4,665,130 A | 5/1987 | Hwo |
| 4,921,749 A | 5/1990 | Bossaert et al. |
| 5,079,273 A | 1/1992 | Kuroda et al. |
| 5,171,628 A | 12/1992 | Arvedson et al. |
| 5,213,744 A | 5/1993 | Bossaert |
| 5,290,635 A | 3/1994 | Matsumura et al. |
| 5,298,561 A | 3/1994 | Cecchin et al. |
| 5,331,047 A | 7/1994 | Giacobbe |
| 5,453,318 A | 9/1995 | Giacobbe |
| 5,504,172 A | 4/1996 | Imuta et al. |
| 5,652,308 A | 7/1997 | Merrill et al. |
| 5,723,217 A | 3/1998 | Stahl et al. |
| 5,726,103 A | 3/1998 | Stahl et al. |
| 5,736,465 A | 4/1998 | Stahl et al. |
| 5,763,080 A | 6/1998 | Stahl et al. |
| 5,891,814 A | 4/1999 | Richeson et al. |
| 5,910,362 A | 6/1999 | Aratake et al. |
| 5,959,006 A | 9/1999 | Pungtrakul |
| 5,994,482 A | 11/1999 | Georgellis et al. |
| 6,010,588 A | 1/2000 | Stahl et al. |
| 6,017,615 A | 1/2000 | Thakker et al. |
| 6,080,818 A | 6/2000 | Thakker et al. |
| 6,096,420 A | 8/2000 | Wilhoit et al. |
| 6,143,818 A | 11/2000 | Wang et al. |
| 6,153,703 A | 11/2000 | Lustiger et al. |
| 6,165,599 A | 12/2000 | Demeuse |
| 6,187,449 B1 | 2/2001 | Sasaki et al. |
| 6,342,565 B1 | 1/2002 | Cheng et al. |
| 6,388,013 B1 | 5/2002 | Saraf et al. |
| 6,476,135 B1 | 11/2002 | Bugada et al. |

(Continued)

FOREIGN PATENT DOCUMENTS

EP  373 660  6/1990

(Continued)

*Primary Examiner*—Nathan M Nutter
(74) *Attorney, Agent, or Firm*—Catherine L. Bell; Darryl M. Tyus

(57) ABSTRACT

This invention relates to homogeneous blends of:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:
   a) 10 to 50 percent crystallinity or less;
   b) a melt flow rate of 200 dg/min or less;
   c) a DSC melting point (second melt Tm) of 130° C. or less;
   d) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
   e) an Mw/Mn of 1.5 to 4,
   f) a triad tacticity of three propylene units, as measured by $^{13}$C NMR, of 75% or greater,
for use in films, fibers, non-wovens, molded articles and the like.

142 Claims, 3 Drawing Sheets

U.S. PATENT DOCUMENTS

| | | | |
|---|---|---|---|
| 6,500,563 B1 | 12/2002 | Datta et al. | |
| 6,503,588 B1 | 1/2003 | Hayashi et al. | |
| 6,525,157 B2 | 2/2003 | Cozewith et al. | |
| 6,531,214 B2 | 3/2003 | Carter et al. | |
| 6,583,076 B1 | 6/2003 | Pekrul et al. | |
| 6,635,715 B1 | 10/2003 | Datta et al. | |
| 6,642,316 B1 | 11/2003 | Datta et al. | |
| 6,747,114 B2 | 6/2004 | Karandinos et al. | |
| 6,750,284 B1 | 6/2004 | Dharmarajan et al. | |
| 6,800,692 B2 | 10/2004 | Farley et al. | |
| 6,875,485 B2 | 4/2005 | Kanai et al. | |
| 6,887,941 B2 | 5/2005 | Zhou | |
| 6,900,147 B2 | 5/2005 | Morman et al. | |
| 6,906,160 B2 | 6/2005 | Stevens et al. | |
| 6,921,794 B2 | 7/2005 | Cozewith et al. | |
| 6,984,696 B2 | 1/2006 | Curry et al. | |
| 2003/0213938 A1 | 11/2003 | Farley et al. | |
| 2004/0122388 A1 | 6/2004 | McCormack et al. | |
| 2005/0106978 A1 | 5/2005 | Cheng et al. | |
| 2005/0107530 A1* | 5/2005 | Datta et al. | 525/70 |
| 2006/0173132 A1* | 8/2006 | Mehta et al. | 525/191 |
| 2006/0178483 A1* | 8/2006 | Mehta et al. | 525/240 |
| 2006/0235159 A1* | 10/2006 | Datta et al. | 525/240 |

FOREIGN PATENT DOCUMENTS

| | | |
|---|---|---|
| EP | 374 695 | 6/1990 |
| EP | 400 333 | 12/1990 |
| EP | 462 574 | 12/1991 |
| EP | 629 631 | 12/1994 |
| EP | 629 632 | 12/1994 |
| EP | 1 002 814 | 5/2000 |
| EP | 1 003 814 | 5/2000 |
| EP | 1 223 191 | 7/2002 |
| EP | 1 505 181 | 2/2005 |
| GB | 2 061 339 | 5/1981 |
| WO | WO 94/28042 | 12/1994 |
| WO | WO 99/07788 | 2/1999 |
| WO | WO 99/19547 | 4/1999 |
| WO | WO 00/00564 | 1/2000 |
| WO | WO 00/01745 | 1/2000 |
| WO | WO 00/01766 | 1/2000 |
| WO | WO 00/69963 | 11/2000 |
| WO | WO 00/69965 | 11/2000 |
| WO | WO 00/70134 | 11/2000 |
| WO | WO 01/48034 | 7/2001 |
| WO | WO 02/083753 | 10/2002 |
| WO | WO 03/021569 | 3/2003 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/035681 | 4/2004 |
| WO | WO 2004/060994 | 7/2004 |
| WO | WO 2004/087806 | 10/2004 |
| WO | WO 2005/052052 | 6/2005 |

* cited by examiner

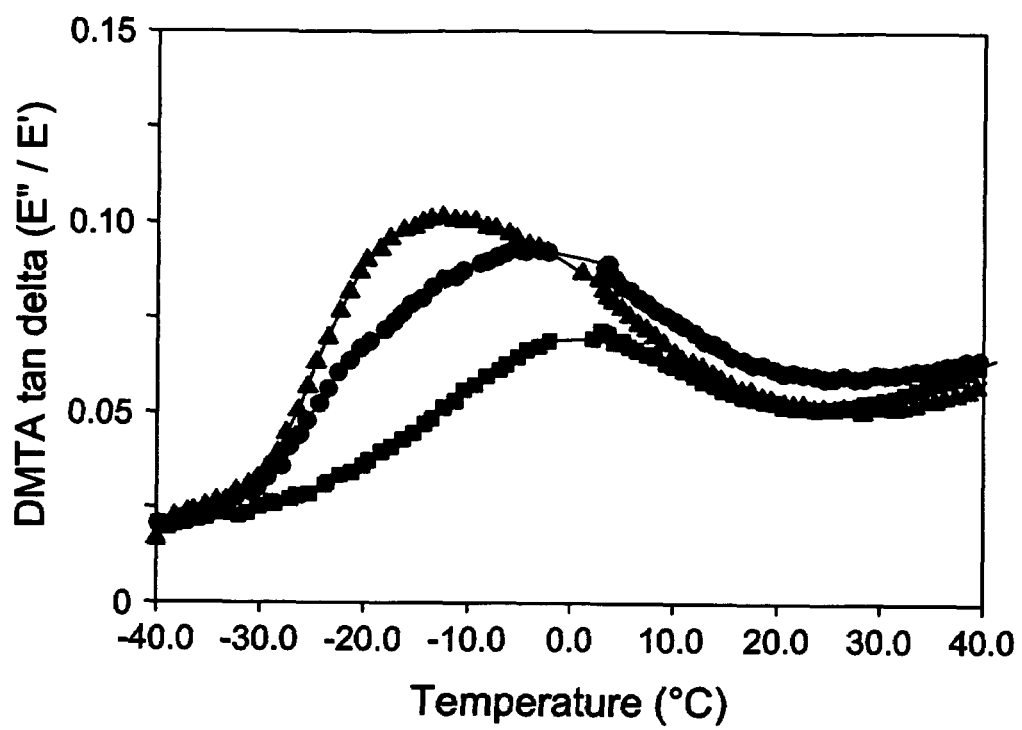
Fig. 1
Fig. 2
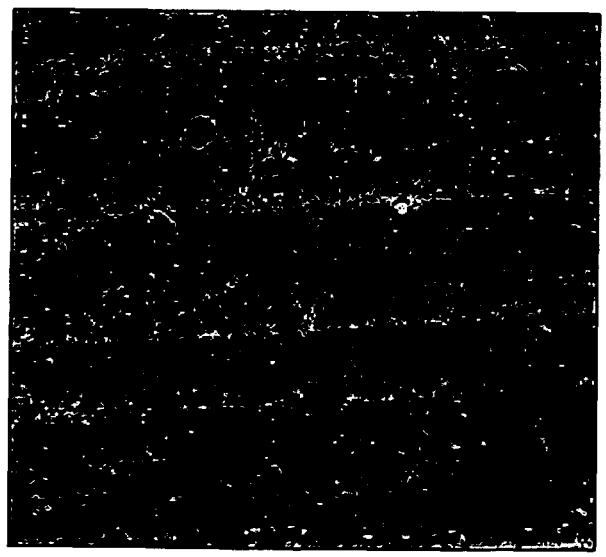
Field of view: 20μm x 20μm

HOMOGENEOUS POLYMER BLEND AND ARTICLES THEREFROM

PRIORITY CLAIM

This application is related to U.S. Ser. No. 10/716,306, filed Nov. 18, 2003. This application claims the benefit of U.S. Ser. No. 60/637,429, filed Dec. 17, 2004. This invention is also related to copending U.S. application Ser. No. 10/402,275 filed Mar. 28, 2003. This invention also claims priority to U.S. Ser. No. 60/655,612 and 60/655,310, both filed Feb. 22, 2005.

FIELD OF THE INVENTION

This invention relates to homogeneous polymer blends and articles made therefrom including fibers, non-wovens, fabrics, films, and molded parts.

BACKGROUND

Isotactic polypropylene and ethylene/propylene copolymers are often used in the industry to produce articles such as fibers, films, molded parts and nonwoven fabrics. Additionally, blending these polymers with other polymers has also been the subject of past endeavors.

For example, U.S. Pat. No. 3,262,992 suggests the addition of a stereoblock copolymer of ethylene and propylene (having high crystalline melting points) to isotactic polypropylene leads to improved mechanical properties of the blend compared to isotactic polypropylene alone.

U.S. Pat. Nos. 3,853,969 and 3,378,606, suggest the formation of in situ blends of isotactic polypropylene and "stereo block" copolymers of propylene and another olefin of 2 to 12 carbon atoms, including ethylene and hexene.

U.S. Pat. No. 3,882,197 suggests blends of stereoregular propylene/alpha-olefin copolymers, stereoregular propylene, and ethylene copolymer rubbers.

U.S. Pat. No. 3,888,949 suggests the synthesis of blend compositions containing isotactic polypropylene and copolymers of propylene and an alpha-olefin, containing between 6-20 carbon atoms, which have improved elongation and tensile strength over either the copolymer or isotactic polypropylene. Copolymers of propylene and alpha-olefin are described wherein the alpha-olefin is hexene, octene or dodecene.

U.S. Pat. No. 4,461,872, discloses a blend produced in part by the use of another heterogeneous catalyst system which is expected to form copolymers which have statistically significant intramolecular and intermolecular compositional differences.

Two publications in the Journal of Macromolecules, 1989, volume 22, pages 3851-3866 described blends of isotactic polypropylene and partially atactic polypropylene which purportedly have desirable tensile elongation properties.

U.S. Pat. Nos. 5,723,217; 5,726,103; 5,736,465; 5,763,080; and 6,010,588 suggest several metallocene catalyzed processes to make polypropylene to produce fibers and fabric. U.S. Pat. No. 5,891,814, discloses a dual metallocene-generated propylene polymer used to make spunbond fibers. WO 99/19547 discloses a method for producing spunbonded fibers and fabric derived from a blend of a propylene homopolymer and a copolymer of polypropylene.

U.S. Pat. No. 6,342,565 and its equivalent WO 00/070134 disclose, at Table 4, column 24, fibers comprising 80, 90, and 95 weight % of Achieve 3854 and 20, 10 and 5 weight %, respectively of a propylene/ethylene copolymer having 13.5% ethylene and an ML of 12. These particular blends are not made into films, molded articles or non-woven materials. The fibers in Table 4 are reported to be inelastic and are unsuitable in the elastic applications desired in U.S. Pat. No. 6,342,565.

U.S. Pat. Nos. 6,525,157; 5,504,172; and WO 00/01745 disclose various propylene/ethylene copolymers. US 2003/0130430 discloses blends of two different propylene/ethylene copolymers. U.S. Pat. No. 6,642,316, WO 00/01766, U.S. Pat. No. 6,500,563 and WO 00/69963 disclose elastic blends of crystalline polypropylene and propylene/ethylene copolymers. U.S. Pat. No. 6,153,703 discloses blends of semicrystalline copolymers and propylene ethylene polymers having very high toughness without loss in modulus. EP 0 629 632 and EP 0 629 631 disclose blends of polypropylene and ethylene-propylene copolymers having certain triad tacticities and proportions of inversely inserted propylene units.

U.S. Pat. No. 6,635,715 and its equivalents EP 1 003 814 B1 and WO 99/07788 disclose blends of polypropylene and Escorene 4292 with propylene/ethylene copolymers for use as thermoplastic elastomers.

EP 0 374 695 A1 discloses visually homogeneous blends of an ethylene-propylene copolymer and Profax™ 6331 by Basell.

U.S. Pat. No. 6,750,284 discloses thermoplastic membranes comprising propylene-ethylene copolymers and up to 40 wt % polypropylene.

WO 03/040095, WO 03/040201, WO 03/040233, and WO 03/040442 disclose various propylene-ethylene copolymers made with non-metallocene catalyst compounds. WO 03/040202 discloses films and sealants made from the propylene-ethylene copolymers made with non-metallocene catalyst compounds.

Additional references of interest include WO 94/28042, EP 1 002 814, WO 00/69965, WO 01/48034, WO04035681A2, EP 0 400 333 B1, EP 0 373 660 B1, WO04060994A1, U.S. Pat. Nos. 5,453,318, 5,298,561, and 5,331,047.

This invention is also related to copending U.S. application Ser. No. 10/402,275 filed Mar. 28, 2003.

However, none of the above disclose blends that have the favorable product property balances displayed by the inventive blends, in applications such as films, molded parts and fibers/nonwoven fabrics, while still maintaining good processability, at the level required by each application. The inventive blends are homogeneous, yet when compared against conventional propylene random copolymers of equivalent comonomer content (e.g. same wt % ethylene) they show improved property profiles in film, molded part and fiber/fabric applications.

SUMMARY

This invention relates to a homogeneous polymer blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less (preferably 100 dg/min or less); and 2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and/or C4 to C10 alpha-olefin comonomers, said semi-amorphous polymers each having:

a) a heat of fusion of 4 to 70 J/g (optionally 10 to 40 J/g); and b) a melt flow rate of 0.1 to 2000 dg/min (preferably 100 dg/min or less); and c) an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and d) an Mw/Mn of 1.5 to 4, and e) a propylene triad tacticity, as measured by $^{13}C$ NMR, of 75% or greater.

In a preferred embodiment, the blend of the semi-crystalline and semi-amorphous polymers is a homogeneous blend.

By homogeneous blend is meant a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on the DMTA trace. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

By heterogeneous blend is meant a composition having two or more morphological phases in the same state. For example a blend of two polymers where one polymer forms discrete packets dispersed in a matrix of another polymer is said to be heterogeneous in the solid state. Also heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM), in the event the SEM and AFM provide different data, then the SEM shall be used. By continuous phase is meant the matrix phase in a heterogeneous blend. By discontinuous phase is meant the dispersed phase in a heterogeneous blend.

BRIEF DESCRIPTION OF THE DRAWINGS

FIG. 1 is a comparison of DMTA tan δ (E"/E') for Homogeneous Blend Examples 4-2, 4-3 and 4-5 versus Temperature FIG. 2 is an AFM micrograph of the cross-section through an injection molded bar of an inventive blend polymer containing 40% of semi-amorphous propylene-ethylene copolymer (SAPEC).

DETAILED DESCRIPTION

Figure 3:
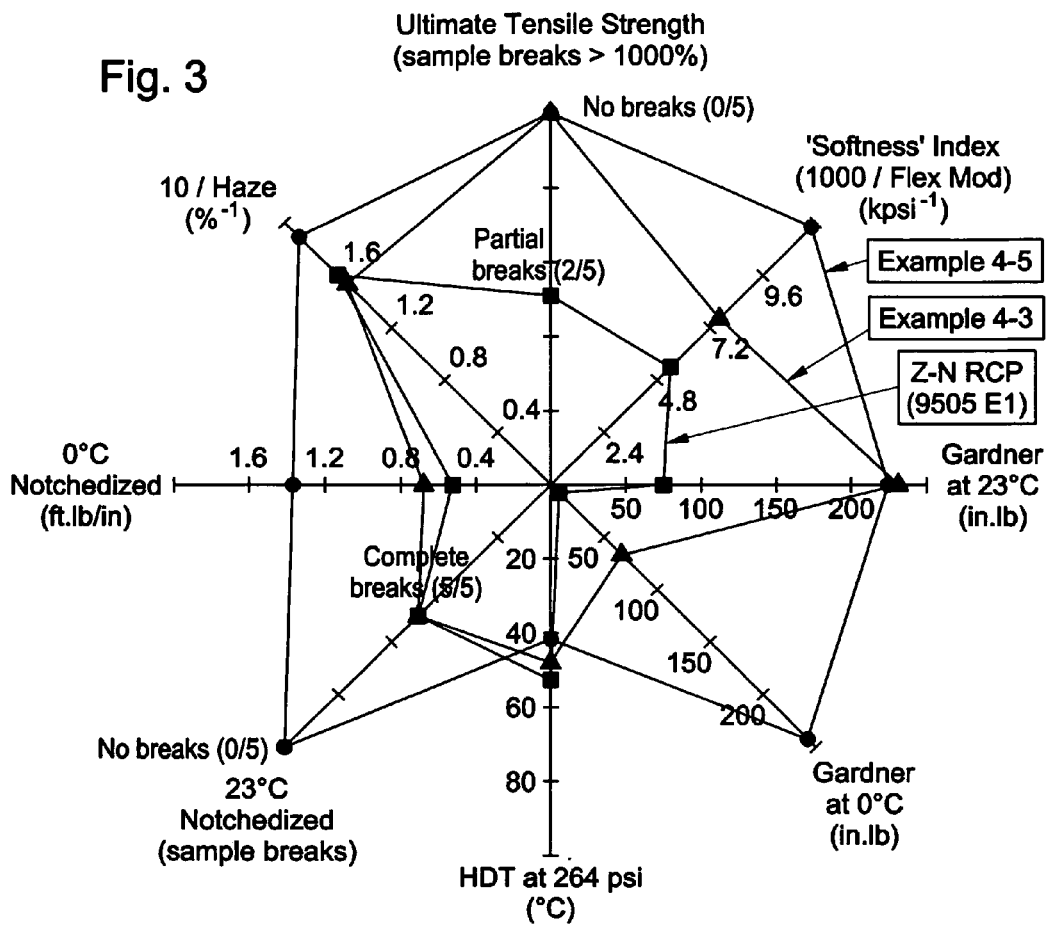
FIG. 3 is a comparison of injection molded-part properties for blend Examples 4-3 and 4-5 and a commercial Ziegler-Natta random copolymer polypropylene.

For purposes of this invention and the claims thereto, the term copolymers means any polymer comprising two or more monomers. For the purposes of this invention and the claims thereto when a polymer is referred to as comprising a monomer, the monomer present in the polymer is the polymerized form of the monomer. Likewise when catalyst components are described as comprising neutral stable forms of the components, it is well understood by one of ordinary skill in the art, that the active form of the component is the form that reacts with the monomers to produce polymers.

The new notation numbering scheme for the Periodic Table Groups is used herein as set out in CHEMICAL AND ENGINEERING NEWS, 63(5), 27 (1985).

As used herein, the term "nonwoven" or "nonwoven fabric" refers to any material made from the aggregation of fibers fabricated by methods such as, for example, spunbonding, melt blowing, thermobonding, or combinations thereof.

As used herein, the term film applies to fabricated articles, extruded or otherwise, that have the thickness as the dominant dimension and where the thickness is uniform and in the range 0.1 to 25 mil (2.5 to 635 μm). The film can be a monolayer or part of a combination of layers (multilayer). A monolayer or multilayer film can be laminated, by extrusion lamination or other means, to other monolayer or multilayer films. The films can be prepared by any fabricating mode recognized in the industry, such as film casting or film blowing.

As used herein, the term "polypropylene", "propylene polymer," or "PP" refers to homopolymers, copolymers, terpolymers, and interpolymers, comprising from 50 to 100 weight % of propylene.

As used herein, the term "reactor grade" refers to polyolefin resin whose molecular weight distribution (MWD), or polydispersity, has not been substantially altered after polymerization, except for pelletizing with an antioxidant. The term particularly includes polyolefins which, after polymerization, have not been treated, or subjected to treatment, to substantially reduce viscosity or substantially reduce average molecular weight.

As used herein, "metallocene" means one or more compounds represented by the formula $Cp_mMR_nX_q$, wherein Cp is a cyclopentadienyl ring which may be substituted, or derivative thereof (such as indene or fluorene) which may be substituted; M is a Group 4, 5, or 6 transition metal, for example titanium, zirconium, hafnium, vanadium, niobium, tantalum, chromium, molybdenum and tungsten; R is a substituted or unsubstituted hydrocarbyl group or hydrocarboxy group having from one to 20 carbon atoms; X may be a halide, a hydride, an alkyl group, an alkenyl group or an arylalkyl group; and m=1-3; n=0-3; q=0-3; and the sum of m+n+q is equal to the oxidation state of the transition metal, further if m is 2 or 3 then any two Cp groups may be bound to one another through a bridging group T, which is typically a group 14 atom which may be substituted with one or two hydrocarbyl groups (a preferred example includes $(CH_3)_2$—Si), if m is 1 then the Cp group may be bound to R via a bridging group T which is typically a group 14 atom which may be substituted with one or two hydrocarbyl groups (a preferred example includes $(CH_3)_2$—Si).

Abbreviations may be used including: Me=methyl, Et=ethyl, Bu=butyl, Ph=phenyl, Cp=cyclopentadienyl, Cp*=pentamethyl cyclopentadienyl, Ind=indenyl, and Flu=fluorene.

As used herein, "support" or "support composition" refers to compounds that are particulate and porous that may optionally be calcined or contacted with a halogen. For example, a fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

As used herein, "metallocene catalyst system" is the product of contacting components: (1) one or more metallocenes; (2) one or more activators; and (3) optionally, one or more support compositions. Preferred activators include alumoxanes (including methylalumoxane and modified-methylalumoxane), stoichiometric activators, ionic activators, non-coordinating anions and the like.

As used herein "semi-crystalline polymer" is defined to be an olefin polymer having a melting point (Tm) of 100° C. or more (as measured by DSC-second melt, described below). As used herein a "semi-amorphous polymer" is defined to be an olefin polymer having a heat of fusion of between 4 and 70 J/g (as determined by DSC, described below). Melting point (Tm), peak crystallization temperature (Tc), heat of fusion (Hf) and percent crystallinity are determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature is typically measured and reported during the second heating cycle (or second melt). For the semi-amorphous polymers, having comparatively low levels of crystallinity, the melting temperature is typically measured and reported during the first heating cycle. Prior to the DSC measurement, the sample is aged (typically by holding it at ambient temperature for a period up to about 5 days) or annealed to maximize the level of crystallinity.

As used herein, molecular weight (Mn and Mw) and molecular weight distribution (MWD or Mw/Mn) are determined by gel permeation chromatography using polystyrene standards. The GPC data were taken on a Waters 150 GPC using three Shodex mixed bed AT-80M/S columns. The solvent used was 1,2,4 trichlorobenzene that contains 300 ppm of the antioxidant Santonox R. The run conditions were an operating temperature of 145 C, a nominal flow rate of 1.0 ml/min and a 300 μL injection volume. Solutions for injection were typically 1.0 to 1.5 mg/ml. The columns were calibrated by running a series of narrow molecular weight polystyrene (PS) standards and recording their retention volumes. Polypropylene (PP) molecular weight values were calculated using the "universal calibration" approach and the following Mark-Houwink coefficients:

|    | k (dL/g)             | a    |
|----|----------------------|------|
| PS | $1.75 \times 10^{-4}$ | 0.67 |
| PP | $8.33 \times 10^{-5}$ | 0.80 |

A third order fit is used to fit the Log (MW) vs Retention volume points. The data were taken and analyzed by Waters Millenium software.

A clarifying agent is defined to be any agent that causes at least a 10%, preferably at least 15%, more preferably at least 20% reduction in haze (as measured on a 1 mm thick molded chip according to ASTM D-1003) as compared to the same composition without the clarifying agent. A nucleating agent is defined to be an additive which forms nuclei in a polymer melt to promote the growth of crystals. (Adipic acid, benzoic acid, or metal salts of these acids, sorbitols, such as 3,4-dimethylbenzylidene sorbitol are examples of nucleating agents, as are many inorganic fillers). A nucleating agent is often a clarifying agent.

As used herein, the terms "multilayer laminate", "laminate", and "composite" refer to a layered structure wherein some of the layers may be spunbond fabric and some may be meltblown fabric such as, for example, spunbond/meltblown/spunbond ("SMS") laminate, or other substrates such as films, netting, or other synthetic or natural material such as disclosed in, for example, U.S. Pat. Nos. 4,041,203; 5,169,706; 5,145,727; 5,178,931 and 5,188,885. Such laminates or composites may also contain multiple layers of spunbond and meltblown fabrics in various combinations such as SMS, SSMMSS, etc. The laminates and composites of the present invention may comprise layers of the same or different materials. Each layer may also comprise a material or a combination of materials. Each layer may also comprise sub-layers.

As used herein, anisotropic behavior refers to fabrics having different properties in different directions. For example, a fabric demonstrating anistropic elongation would have an elongation in the machine direction (MD) different from its elongation measured in the transverse direction (TD). The same fabric may also be characterized as having an asymmetric stretch. In this example, the anisotropic behavior typically has elongation in the machine direction (MD) substantially less than the elongation in the transverse direction (TD). The term substantially, in this context, means less than 90%, alternatively less than 80%, or less than 75%.

As used herein, the softness of a nonwoven fabric is measured according to the "Handle-O-Meter" test as specified in operating manual on Handle-O-Meter model number 211-5 from the Thwing-Albert Instrument Co., 10960 Dutton Road, Phila., Pa., 19154. The Handle-O-Meter reading is in units of grams. The lower the value of hand (grams), the softer the fabric. The modifications are: 1. Two specimens per sample were used and 2. Readings are kept below 100 gram by adjusting the slot width used and the same slot width is used through out the whole series of samples being compared, preferably 10 mm.

Blend Components -Semi-Crystalline Polymer

In a preferred embodiment, the blends of this invention comprise from 60 to 99 weight percent of one or more semi-crystalline polymers (based upon the weight of the semi-crystalline and semi-amorphous polymers), preferably from 60 to 90 weight %, preferably from 60 to 85 weight %, preferably from 60 to 75 weight %, each semi-crystalline polymer comprising propylene and from 0 to 5 weight % alpha-olefin comonomer (based upon the weight of the polymer), preferably from 0.1 to 4 weight %, preferably from 0.25 to 3 weight %. Preferably the alpha olefin comonomer is a C2 to C10 alpha olefin, preferably selected from the group consisting of ethylene, butene, pentene, hexene, heptene, octene, nonene, and decene, preferably ethylene, butene, hexene, and octene, preferably ethylene. (For purposes of this invention when a copolymer is described as comprising propylene and one or more C2 to C10 olefins, or alpha olefins, the C2 to C10 olefins or alpha olefins do not include C3 i.e. propylene.)

Preferred semi-crystalline polymers have a melting point (Tm—second melt as measured by DSC as described above) between 100 and 170° C., preferably between 110 and 160° C., preferably between 125 and 160° C.

Preferred semi-crystalline polymers have a melt flow rate of from 0.1 to 2000 dg/min The choice of melt flow rate depends on the end-application for the final blend. For example, typical melt flow rates range from 0.1 to 20 dg/min for films, 1 to 100 dg/min for molded articles, 15 to 60 dg/min for spunbond nonwovens and 200 to 2000 dg/min for melt blown nonwovens. Melt flow rate (or MFR) is measured according to ASTM D-1238 Condition L (2.16 kg, 230° C.).

Preferred semi-crystalline polymers have an Elongation at Break of 700% or less, preferably 300 to 700%, as measured by ASTM D 638, 2 in/min/50 mm/min on a 0.125 in (3.18 mm) thick injection molded sample.

Preferred semi-crystalline polymers have a 1% Secant Flexural Modulus of from 100,000 psi to 250,000 psi (690 to 1720 MPa), preferably from 150,000 psi to 250,000 psi (1031 to 1720 MPa) as measured by ASTM 790A (0.05 in/min/1.3 mm/min). "High-crystallinity polypropylenes," e.g. those having values above 250,000 psi (1720 MPa) can also be used.

Any propylene polymer having 0 to 5 weight % comonomer, a melting point between 100 and 170, and an MFR of 2000 dg/min or less may be used in the practice of this invention. Suitable examples include polymers produced by Ziegler-Natta catalyst systems, metallocene systems, and combinations thereof. The polymers may be produced by any means including solution, slurry, gas phase, supercritical or high pressure. In a particularly preferred embodiment the propylene polymers useful herein have a molecular weight distribution (Mw/Mn) of 5 or less, preferably between 1.5 and 4, preferably between 1.5 and 3. In another preferred embodiment, preferred propylene polymers useful herein include those produced by metallocene catalyst systems. In another embodiment preferred propylene polymers useful herein include those having a composition distribution breadth index (CDBI) of 60% or more, preferably 70% or more, preferably 80% or more, preferably 90% or more. (CDBI is measured as described in WO 93/03093, with the modification that any fractions having a weight average molecular weight (Mw) below 25,000 g/mol are disregarded.) Preferred propylene polymers that can be used in the practice of this invention include those propylene polymers sold by ExxonMobil Chemical Company under the tradename ACHIEVE™. Particularly useful grades include ACHIEVE™ 3854, ACHIEVE™ 1654E1, ACHIEVE™ 3825, ACHIEVE™ 1605, available from ExxonMobil Chemical Company in Houston, Tex. Additional preferred propylene polymers useful in the practice of this invention include those propylene homopolymers, and random copolymers available from ExxonMobil Chemical Company under the grade names: PP1024E4, PP1042, PP1032, PP1044, PP1052, PP1105E1, PP3155 and PP9852E1, PP9272, PP9513, PP9544, PP9562. In some instances impact copolymers can be utilized in the practice of this invention. Several are available from ExxonMobil Chemical Company (e.g. PP7032 E2).

In another embodiment preferred semi-crystalline polymers useful herein have a melting point greater than 110° C., preferably greater than 115° C., and most preferably greater than 130° C. and/or a heat of fusion of greater than 60 J/g, preferably at least 70 J/g, preferably at least 80 J/g, as determined by DSC analysis described above.

The molecular weight of the semi-crystalline polymer can be between 10,000 to 5,000,000 g/mol, alternatively 25,000 to 500,000 g/mol, preferably with a polydispersity index (PDI—Mw/Mn) between 1.5 to 4, preferably 1.5 to 3.

Preferred semi-crystalline polymers may be isotactic, highly isotactic, syndiotactic, or highly syndiotactic. In one embodiment, the semi-crystalline polymer is an isotactic polypropylene. In another embodiment, the semi-crystalline polymer is a highly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, a polypropylene homo- or co-polymer having at least 85% isotactic pentads is the semi-crystalline polymer. In another embodiment, the semi-crystalline polymer has at least 90% isotactic pentads. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In a desirable embodiment, a polypropylene homo- or co-polymer having at least 85% syndiotactic pentads is the semi-crystalline polymer. In another embodiment, a propylene homo- or co-polymer having at least 90% syndiotactic pentads is the semi-crystalline polymer.

Blend Components—Semi-Amorphous Polymer

In a preferred embodiment, blends of this invention comprise from 1 to 40 weight percent of one or more semi-amorphous polymers (based upon the weight of the semi-crystalline and semi-amorphous polymers), preferably from greater than 10 to 40 weight %, preferably from 15 to 40 weight %, preferably from 25 to 40 weight %. In some embodiments, the semi-amorphous polymers comprise propylene and from 5 to 12 weight % of one or more C2 to C10 alpha-olefin comonomers, preferably from 8 to 11 weight %, based upon the weight of the copolymer. Preferably the alpha olefin comonomer is a C2 to C10 alpha olefin selected from the group consisting of ethylene, butene, pentene, hexene, heptene, octene, nonene, and decene, preferably ethylene, butene, hexene, and octene, preferably ethylene.

The ethylene content of the semi-amorphous polymers can be measured as follows. A thin homogeneous film is pressed at a temperature of about 150° C. or greater, then mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045 X$^2$, wherein X is the ratio of the peak height at 1155 cm$^{-1}$ and peak height at either 722 cm$^{-1}$ or 732 cm$^{-1}$, whichever is higher.

Preferred semi-amorphous polymers having from 5 to 12 weight % comonomers useful in this invention preferably have a percent crystallinity of 8 to 50%, preferably from 9 to 45%, preferably from 10 to 40%, preferably from 10 to 35%. Percent crystallinity is determined according to the DSC procedure described above.

Preferred semi-amorphous polymers useful in this invention preferably have a melt flow rate of 0.1 to 2000 dg/min. The choice of melt flow rate depends on the end-application for the final blend. For example, typical melt flow rates range from 0.1 to 20 dg/min for films, 1 to 100 dg/min for molded articles, 15 to 60 dg/min for spunbond nonwovens and 200 to 2000 dg/min for melt blown nonwovens. Melt flow rate (or MFR) is measured according to ASTM D-1238 (2.16 kg and 230° C.).

Preferred semi-amorphous polymers useful in this invention preferably have a DSC melting point (Tm) of 130° C. or less, preferably 100° C. or less, as measured by the DSC procedure described above.

Preferred semi-amorphous polymers useful in this invention preferably have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative), preferably 10% (relative), of the average weight % comonomer of the copolymer. The fractions are obtained at temperature increases of approximately 8 C between stages. The intermolecular composition distribution of the copolymer is determined by thermal fractionation in hexane as follows: about 30 grams of the semi-amorphous polymer is cut into small cubes of about ⅛ inch (0.32 cm) on the side and is then introduced into a thick walled glass bottle closed with screw cap along with 50 mg of Irganox1076, an antioxidant commercially available from Ciba-Geigy Corporation. Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the semi-amorphous polymer soluble at 40° C., 48° C., 55° C., and 62° C. are obtained at temperature increases of approximately 8° C. between stages. The soluble polymers are dried, weighed and analyzed for composition, as wt % ethylene content. To produce a copolymer having the desired narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

Preferred semi-amorphous polymers useful in this invention preferably have a molecular weight distribution (Mw/Mn) of Mw/Mn of less than 5, preferably between 1.5 and 4, preferably between 1.5 and 3.

In another embodiment polymers that are useful in this invention as semi-amorphous polymers include homopolymers and random copolymers of propylene having a heat of fusion as determined by Differential Scanning Calorimetry (DSC) of less than 75 J/g, an MFR of 1500 dg/min or less, and contains stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 5 wt % to 12 wt % polymerized ethylene units, based on the total weight of the polymer; has a narrow intermolecular composition distribution (e.g. 75% or more); has a melting point (Tm) of from 25° C. to 130° C., or from 35° C. to 100° C.; has a heat of fusion within the range having an upper limit of 75 J/g and a lower limit of 10 J/g; has a molecular weight distribution Mw/Mn of from 1.8 to 4.5; and has a melt flow rate of less than 40 dg/min, or less than 200 dg/min (as measured at 230° C., and 2.16 kg, ASTM D-1238).

A particularly preferred polymer useful in the present invention as a semi-amorphous polymer is a polymer with a moderate level of crystallinity due to stereoregular propylene sequences. The polymer can be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In one embodiment, the useful polymers described above further include a non-conjugated diene monomer to aid in later chemical modification of the blend composition (such as crosslinking). The amount of diene present in the polymer is preferably less than 10% by weight, and more preferably less than 5% by weight. The diene may be any non-conjugated diene which is commonly used in ethylene propylene copolymers including, but not limited to, ethylidene norbornene, vinyl norbornene, and dicyclopentadiene.

In one embodiment, the semi-amorphous polymer is a random propylene copolymer having a narrow composition distribution. In another embodiment, the semi-amorphous polymer is a random propylene copolymer having a narrow composition distribution and a melting point of from 25° C. to 130° C., preferably 35° C. to 100° C., preferably 35 to 95° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intermolecular composition distribution (i.e., randomness) of the copolymer may be determined by $^{13}$C NMR, which locates the comonomer residues in relation to the neighboring propylene residues. The intermolecular composition distribution of the copolymer is determined by thermal fractionation in hexane as previously described.

In another embodiment, semi-amorphous polymers useful herein have a heat of fusion of 75 J/g or less, as determined by DSC described above, preferably from 10 to 65 J/g.

In another embodiment, semi-amorphous polymers useful herein have a weight average molecular weight of from 20,000 to 1,000,000, preferably from 25,000 to 500,000 g/mol.

Preferred semi-amorphous polymers used in embodiments of the present invention have a propylene tacticity index (m/r) ranging from a lower limit of 4 or 6 to an upper limit of about 8, 10, or 12. The propylene tacticity index, expressed herein as "m/r", is determined by $^{13}$C nuclear magnetic resonance (NMR). The propylene tacticity index m/r is calculated as defined in H. N. Cheng, *Macromolecules,* 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred semi-amorphous polymers have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred semi-amorphous polymers useful in this invention have a triad tacticity of three propylene units, as measured by $^{13}$C NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed for semi-amorphous copolymers of the present invention as the ratio of the number of units of the specified tacticity to all of the propylene triads in the copolymer. The triad tacticity (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

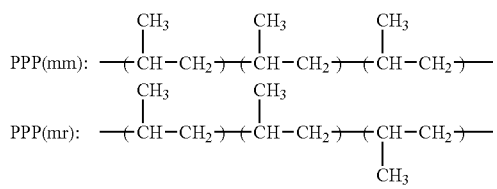

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP (mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

In another embodiment polymers that are useful in this invention as semi-amorphous polymers include homopolymers and random copolymers of propylene having a heat of fusion as determined by Differential Scanning Calorimetry (DSC) of less than 75 J/g, and or an MFR of 200 dg/min or less, and contains stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 5 wt % to 12 wt % polymerized ethylene units, based on the total weight of the polymer; has a narrow intermolecular composition distribution (e.g. 75% or more); has a melting point (Tm) of from 25° C. to 120° C., or from 35° C. to 80° C.; has a heat of fusion within the range having an upper limit of 75 J/g, 70 J/g, or 25 J/g and a lower limit of 1 J/g or 3 J/g; has a molecular weight distribution Mw/Mn of from 1.8 to 4.5; and has a melt flow rate of less than 40 dg/min, or less than 20 dg/min (as measured at 230° C., and 2.16 kg, ASTM 1238).

Preferred polymers useful as semi-amorphous copolymers in this invention include polymers described in detail as the "Second Polymer Component (SPC)" in WO 00/69963, WO 00/01766, WO 99/07788, WO 02/083753, and described in further detail as the "Propylene Olefin Copolymer" in WO 00/01745, all of which are fully incorporated by reference herein.

Preferred semi-amorphous copolymers may be produced in a solution process using a metallocene catalyst as follows. In a preferred embodiment, a continuous solution polymerization process is used to produce copolymers of propylene and from 5 to 12 weight % ethylene preferably utilizing a metallocene catalyst, namely, 1,1'-bis(4-triethylsilylphenyl)methylene-(cyclopentadienyl)(2,7-di-tertiary-butyl-9-fluorenyl)hafnium dimethyl with dimethylaniliniumtetrakis-(pentafluorophenyl) borate as an activator. An organoaluminum compound, namely, tri-n-octylaluminum, may be added as a scavenger to the monomer feedstreams prior to introduction into the polymerization process. For preferred polymers, dimethylsilylbis(indenyl)hafnium dimethyl is used in combination with dimethylaniliniumtetrakis (pentafluorophenyl) borate. In other embodiments, dimethylsilyl bis(2-methyl-5-phenylindenyl)zirconium di alkyl (such as methyl) and or dimethylsilyl bis(2-methylindenyl)zirconium di alkyl (such as methyl) is used with an activator (dimethylaniliniumtetrakis(pentafluorophenyl)borate and or triaryl carbenium(pentafluorophenyl)borate). Preferably the solution polymerization is conducted in a single, or optionally in two, continuous stirred tank reactors connected in series with hexane used as the solvent. In addition, toluene may be added to increase the solubility of the co-catalyst. The feed is transferred to the first reactor at a reaction temperature between about 50° C. to about 220° C. Hydrogen gas may also be added to the reactors as a further molecular weight regulator. If desired, polymer product is then transferred to a second reactor, which is operated at a temperature between about 50° C. to 200° C. Additional monomers, solvent, metallocene catalyst, and activators can be fed to the second reactor.

Preferred semi-amorphous polymers may also be produced by the continuous solution polymerization process described in WO 02/34795, advantageously in a single reactor and separated by liquid phase separation from the alkane solvent. Preferred semi-amorphous polymers may also be produced by the polymerization process described at page 6 lines 24-57 of EP 1 003 814 B1.

Further detailed instructions on how to make such preferred semi-amorphous polymers can be found in WO 02/083754.

Preferred semi-amorphous polymers useful herein are made using a metallocene catalyst system.

Preferred semi-amorphous polymers include VM™ 1000, VM™ 2000, and VM™ 3000 available from ExxonMobil Chemical Company in Houston, Tex.

Blend Properties

In a preferred embodiment, the blend described herein is homogeneous, believed to result from the blending together of mutually miscible components and is characterized by a decrease (preferably a uniform decrease) in crystallinity (also DSC second melt Tm and Tc) with increasing amounts of semi-amorphous polymer in the blend.

The blends of the present invention can be prepared by any procedure that causes the intimate admixture of the components. This includes reactor blends, where the semi-crystalline polypropylene component is polymerized in one reactor (or one stage of one reactor) and the polymerized product is transferred to a different reactor or different stage of the same reactor, where polymerization of the semi-amorphous polymer occurs. The final blend product comprises an intimate mix of the two polymer components. Alternately, the blends can be prepared by post-reactor mixing of the semi-crystalline and semi-amorphous polymer components. For example, they may be blended in a tumbler, static mixer, batch mixer, extruder, or a combination thereof. The mixing step may take place as part of a processing method used to fabricate articles, such as in the extruder on an injection molding, machining or fiber line. Likewise, the components can be combined by melt pressing the components together on a Carver press to a thickness of 0.5 millimeter (20 mils) and a temperature of 180° C., rolling up the resulting slab, folding the ends together, and repeating the pressing, rolling, and folding operation 10 times. Internal mixers are particularly useful for solution or melt blending. Blending at a temperature of 180° C. to 240° C. in a Brabender Plastograph for 1 to 20 minutes has been found satisfactory. Still another method that may be used for admixing the components involves blending the polymers in a Banbury internal mixer above the flux temperature of all of the components, e.g., 180° C. for 5 minutes. Continuous mixing may also be used. These processes are well known in the art and include single and twin screw mixing extruders, static mixers for mixing molten polymer streams of low viscosity, impingement mixers, as well as other machines and processes, designed to blend the semi-crystalline polymer component and the semi-amorphous polymer component in intimate contact.

The blends of the present invention preferably have a permanent tension set of 65% or more, preferably 85% or more, preferably 100% or more, preferably 125% or more, preferably 150% or more.

Permanent tension set is measured according to the following procedure. Hysteresis testing is done on molded samples having the required dumbbell geometry (ASTM designation type I bars for polypropylene), using the following test procedure. The deformable zone (2.54 cm long section) of the sample is stretched to 200% of its original length at a deformation rate of 20 in/min (51 cm/min) in an Instron (The Instron Corporation, Canton, Mass.) testing machine. The sample is then allowed to relax while the machine retracts and comes back to the point where the stress is zero. The machine resets the new zero elongation point at this position. With the specimen still within the grips, the second cycle is then initiated for another 200% extension. Again, the machine is allowed to come back to the point where the stress is zero on the retraction cycle. The set for each cycle is determined with reference to their respective zero elongation points. Two specimens are tested for each sample. The average of the set values over the two cycles is taken as the permanent tension set.

The blends of the present invention preferably have a haze of 50% or less, preferably 40% or less, preferably 20% or less, preferably 15% or less, preferably 12% or less, preferably 10% or less, as measured by ASTM D 1003 on a 1 mm thick injection molded haze chip sample provided that the blend in question is combined with 2500 ppm of bis (3,4 dimethylbenzylidene)sorbitol (also called DMDBS and available as Millad 3988 from Milliken Chemicals), prior to being molded into the 1 mm chip. While the inventive blends are combined with a clarifying agent for haze testing on the blend, the final article (film, molded part, other) of this invention may or may not contain clarifying agent. Film and molded part haze are also measured according to ASTM D-1003.

In another embodiment, the blends of the present invention preferably have a melt flow rate (ASTM D-1238 Condition L; 230° C., 2.16 kg) of 0.1 to 2000 dg/min. The choice of melt flow rate depends on the end-application for the final blend. For example, typical melt flow rates range from 0.1 to 20 dg/min for films, 1 to 100 dg/min for molded articles, 15 to 60 dg/min for spunbond nonwovens and 200 to 2000 dg/min for melt blown nonwovens.

In certain embodiments, the blends of the present invention may also comprise a third polymer component. The third polymer component may be added to the semi-crystalline polymer, the semi-amorphous polymer or the blend by methods well known in the art. In these embodiments, the third polymer component (TPC) comprises low density polyethylene (density 0.915 to less than 0.935 g/cm$^3$), linear low density polyethylene, ultra low density polyethylene (density 0.85 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), or combinations thereof. For example, polyethylene produced using a metallocene catalyst system (mPEs), i.e., ethylene homopolymers or copolymers may be employed. In a particular example, mPE homopolymers and copolymer are those produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Illustrative but not exclusive commercially products are available from ExxonMobil Chemical Company, Houston, Tex., under the tradenames EXCEED™ and EXACT™ among others well known in the industry. Blends where the third component is a propylene polymer or copolymer, an EP or EPDM copolymer rubber, another polyolefin (e.g. EVA ethylene vinlyacetate) are also envisioned.

The blends of this invention may also comprise additives and other ingredients. For example the blends of this invention may comprise slip agents, preferably present at 50 ppm to 10 weight %, preferably 50 to 5000 ppm. Preferably the slip additives are present at 0.001 to 1 wt % (10 to 10,000 ppm), more preferably 0.01 to 0.5 wt % (100 to 5000 ppm), more preferably 0.1 to 0.3 wt % (1000 to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmita-mido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethy-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents include amides having the chemical structure $CH_3(CH_2)_7 CH=CH(CH_2)_x CONH_2$ where x is 5 to 15. Particularly preferred amides include: 1) Erucamide $CH_3(CH_2)_7 CH=CH(CH_2)_{11}CONH_2$ which may also be referred to as cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8 CONH_2$; and 3) Oleamide which may also be preferred to as N-9-octadecenyl-hexadecanamide) $CH_3(CH_2)_7CH=CH(CH_2)_7CONH_2$. In another embodiment, stearamide is also useful in this invention. Other preferred slip additives include those described in WO 2004/005601A1.

The blends and final articles of this invention may also comprise additives and other ingredients. For example the blends of this invention may comprise nucleating agents, preferably present at 50 to 4000 ppm based on total polymer in the blend composition. Preferred nucleating agents include: Hyperform (e.g. HPN-68) and Millad additives (e.g. Millad 3988) from Milliken Chemicals, Spartanburg, S.C. and organophosphates like NA-11 and NA-21 from Amfine Chemicals, Allendale, N.J.

Further, a variety of additives may be incorporated into the embodiments described above used to make the blends and final articles for various purposes. Such additives include, for example, stabilizers, antioxidants, fillers, colorants, and antiblock agents. Primary and secondary antioxidants include, for example, hindered phenols, hindered amines, and phosphites. Nucleating agents include, for example, sodium benzoate and talc. Also, other nucleating agents may also be employed such as Ziegler-Natta olefin product or other highly crystalline polymer. Antiblock agents include amorphous silicas, talc, zinc stearate among others. Additives such as dispersing agents, for example, Acrowax C, can also be included. Catalyst deactivators are also commonly used, for example, calcium stearate, hydrotalcite, and calcium oxide, and/or other acid neutralizers known in the art.

Other additives include, for example, fire/flame retardants, plasticizers, vulcanizing or curative agents, vulcanizing or curative accelerators, cure retarders, processing aids, tackifying resins, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include lubricants and UV stabilizers. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired.

Process oils can also be optimally added to the embodiments described above. The blend may include process oil in the range of from 1 to 50, alternatively in the range of from 2 to 20 parts by weight of process oil per hundred parts of total polymer components. The addition of process oil in moderate amounts lowers the viscosity and stiffness of the blend while improving the properties of the blend at temperatures near and below 0° C. It is believed that these benefits arise by the lowering of the Tg of the blend. Additional benefits of adding process oil to the blend include improved processibilty and a better balance of elastic and tensile strength. The process oils typically consist of (a) hydrocarbons consisting essentially of carbon and hydrogen with traces of hetero atoms such as oxygen or (b) essentially of carbon, hydrogen and at least one hetero atom such as dioctyl phthalate, ethers and polyethers. Preferred process oils have a high boiling point to be substantially involatile at 200° C. Such process oils are commonly available either as neat solids or liquids or as physically absorbed mixtures of these materials on an inert support (e.g. clays, silica) to form a free flowing powder. Other useful process oils include a mixture of a large number of chemical compounds which may consist of linear, acyclic but branched, cyclic and aromatic carbonaceous structures. Another family of useful process oils are certain low to medium molecular weight (Molecular weight ($M_n$)<10,000) organic esters and alkyl ether esters. Examples of process oils are Sunpar™ 150 and 220 from The Sun Manufacturing Company of Marcus Hook, Pa., USA and Hyprene™ V750 and Hyprene™ V1200 from Ergon, in Jackson, Miss. and IRM 903 from Calumet Lubricants Company in Princeton, La. It is also anticipated that combinations of process oils each of which is described above may be used in the practice of the invention. In certain embodiments, it is important that in the selection the process oil be compatible or miscible with the blend composition in the melt to form a homogenous one phase blend, although two phase blends and multi-phase blends are also contemplated. The addition of the process oils to the blend or blend polymer components maybe made by any of the conventional means known to the art.

The addition of certain process oils to lower the glass transition temperature of the blends of isotactic polypropylene and ethylene propylene diene rubber has been described in the art by Ellul in U.S. Pat. Nos. 5,290,886 and 5,397,832. These procedures are easily applicable to the current invention.

In certain embodiments the components as well as the blends may include various amounts of plasticizer(s). In one embodiment, the plasticizer comprises $C_6$ to $C_{200}$ paraffins, and $C_8$ to $C_{100}$ paraffins in another embodiment. In another embodiment, the plasticizer consists essentially of $C_6$ to $C_{200}$ paraffins, and consists essentially of $C_8$ to $C_{100}$ paraffins in another embodiment. For purposes of the present invention and description herein, the term "paraffin" includes all isomers such as n-paraffins, branched paraffins, isoparaffins, and may include cyclic aliphatic species, and blends thereof, and may be derived synthetically by means known in the art, or from refined crude oil. Suitable plasticizers also include "isoparaffins", "polyalphaolefins" (PAOs) and "polybutenes" (a subgroup of PAOs). These three classes of compounds can be described as paraffins which can include branched, cyclic, and normal structures, and blends thereof. They can be described as comprising $C_6$ to $C_{200}$ paraffins in one embodiment, and $C_8$ to $C_{100}$ paraffins in another embodiment. Preferred plasticizers include those described in WO 2004/014998 (which is incorporated by reference herein), particularly those plasticizers described at page 9, line 31 to page 26, line 19. Preferred poly-alpha-olefins (PAO's) useful in this invention include those described in WO 2004/014998, particularly those described at page 17, line 19 to page 19, line 25. Likewise Group III Basestocks may be used as plasticizers herein. Preferred Group III Basestocks include those described in WO 2004/014998, particularly those Group III Basestocks which are severely hydrotreated mineral oils having a saturates levels of 90% or more, preferably 92% or more, preferably 94% or more, preferably 95% or more, and sulfur contents less than 0.03%, preferably between 0.001 and 0.01%, and Viscosity Index (VI) is in excess of 120, preferably 130 or more. Preferably the Group III hydrocarbon base stock has a kinematic viscosity at 100° C. of 3 to 100, preferably 4 to 100 cSt, preferably 6 to 50 cSt, preferably 8 to 20; and/or a number average molecular weight of 300 to 5,000, preferably 400 to 2,000, more preferably 500 to 1,000; and/or a carbon number of 20 to 400, preferably 25 to 400, preferably 35 to 150, more preferably 40 to 100. The plasticizer may be present in the blends of the invention from 0.1 wt % to 60 wt % in one embodiment (based upon the weight of the blend, respectively), and from 0.5 wt % to 40 wt % in another embodiment, and from 1 wt % to 20 wt % in yet another embodiment, and from 2 wt % to 10 wt % in yet another embodiment, wherein a desirable range may comprise any upper wt % limit with any lower wt % limit described herein.

Films

In one embodiment the blends of the present invention are formed into films. Polyolefin films are widely used; for example, in shopping bags, pressure sensitive tape, gift wrap, labels, food packaging, etc. Most of these applications require high tear (in machine and transverse directions) and impact strengths, puncture resistance, high gloss, and low haziness. The blends described above may be formed into monolayer or multilayer films appropriate for such applications. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another embodiment the layer comprising the blends described herein may be combined with one or more other layers. The other layer(s) may be any layer typically included in multilayer film structures. For example the other layer or layers may be:

1. Polyolefins

Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar Polymers

Preferred polar polymers include homopolymers and copolymers of esters, amides, acetates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic polymers Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous

Other preferred layers can be paper, wood, cardboard, metal, metal foils (such as aluminum foil and tin foil), metallized surfaces, glass (including silicon oxide (SiO.x) coatings applied by evaporating silicon oxide onto a film surface), fabric, spunbonded fibers and fabrics, and non-wovens (particularly polypropylene spun bonded fibers and fabrics or non-wovens), and substrates coated with inks, dyes, pigments, and the like.

The films may vary in thickness depending on the intended application, however films of a thickness from 2.5 to 635 μm are usually suitable. Films intended for packaging are usually from 10 to 250 μm thick. The thickness of the sealing layer is typically 1 to 50 μm. There may be a sealing layer on both the inner and outer surfaces of the film or the sealing layer may be present on only the inner or the outer surface.

Additives such as slip, antiblock, antioxidants, pigments, fillers, processing aids, UV stabilizers, neutralizers, lubricants, surfactants and/or nucleating agents may also be present in one or more than one layer in the films. Examples of useful additives include silicon dioxide, titanium dioxide, polydimethylsiloxane, talc, dyes, wax, calcium stearate, carbon black, low molecular weight resins and glass beads.

In another embodiment one more layers may be modified by corona treatment, electron beam irradiation, gamma irradiation, or microwave irradiation. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. The films comprising a hydrocarbon resin may be oriented in uniaxial or biaxial directions to the same or different degrees.

In a preferred embodiment, this invention relates to a film comprising a layer comprising one or more of the blends above (where the layer is 2.5 to 635 μm/0.1 to 25 mils thick) where the film has:

a) a haze of 10% or less,
b) a 1% Secant Tensile Modulus of 125,000 to 30,000 psi (205 MPa to 860 MPa),
c) an Elmendorf tear in both the machine direction and transverse direction of 40 g/mil or more (1.57 g/micron or more),
d) a total energy impact of 3 J or more, and
e) a melt flow rate of 0.5 to 100 dg/min.

In a preferred embodiment, the films and or the layers comprising the blends described herein are from 2.5 to 635 microns thick, preferably between 5 to 550 microns thick, preferably 10 to 500 microns thick, preferably between 25 to 400 microns thick, preferably 20 to 200 microns thick.

The films of the present invention preferably have a haze of 10% or less, preferably 5% or less, preferably 3% or less, preferably 2% or less, preferably 1% or less, preferably 0.5% or less, as measured by ASTM D 1003.

In another embodiment, the films of the present invention preferably have a 45° gloss (MD and TD) of 70 or more, preferably 75 or more, preferably 80 or more, preferably 90 or more, as measured by ASTM D 2457 at an angle of 45°, unless otherwise stated.

In another embodiment, the films of the present invention have low modulus (high degree of softness); preferably have 1% Secant tensile Modulus (as measured by ASTM D 882) of 125,000 psi to 100,000 psi (690 to 860 MPa), preferably 125,000 psi to 50,000 psi, (345 to 860 MPa), preferably 125,000 to 30,000 psi (205 to 860 MPa).

In another embodiment, the films of the present invention preferably have an Elmendorf tear in the machine direction (MD) of 40 g/mil or more (1.57 g/micron or more), preferably 40 g/mil to 75 g/mil (1.57 to 2.95 g/μm), preferably 40 g/mil to 100 g/mil (1.57 to 3.94 g/μm), as determined by ASTM D1922, and normalized by the average film thickness in mil (0.001 in or 25.4 μm).

In another embodiment, the films of the present invention preferably have a total energy impact of 2 ft.lb or more (2.7 J or more), preferably 2 to 6 ft.lb or more (2.7 to 8.1 J).

In another embodiment, the films of the present invention preferably have a Ultimate Tensile Strength (as determined by ASTM D882.) of 5000 psi or more (34.5 MPa) along both MD and TD.

In another embodiment, the films of the present invention preferably have a Elongation at Break) (as determined by ASTM D882.) of 500% or more along both MD and TD.

In another embodiment, the films of the present invention preferably have a Puncture Energy of 25 in.lb/mil (0.11 J/μm) or more as measured following ASTM D5748.

In another embodiment, the films of the present invention preferably have a Puncture resistance of 8 lb/mil (1.4 N/μm) or more as measured following ASTM D5748.

The blends of this invention can be used in application areas requiring soft films, such as those used in health-care applications and diapers. The good tear propagation resistance and total energy impact resistance, coupled with the low haze, offer broad opportunities in packaging films.

Molded Products

The blends describe herein may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film or sheet of the composition of this invention (and any other layers or materials) is placed on a shuttle rack to hold it during heating. The shuttle rack indexes into the oven which preheats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, bottles and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendering. Sheet will generally be considered to have a thickness of from 10 mils to 100 mils (254 μm to 2540 μm), although sheet may be substantially thicker. Tubing or pipe may be obtained by profile extrusion for uses in medical, potable water applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 μm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 μm to 6000 μm in one embodiment, from 200 μm to 6000 μm in another embodiment, and from 250 μm to 3000 μm in yet another embodiment, and from 500 μm to 1550 μm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fluid containers and small enclosed structures. In one embodiment of this process, compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

Preferred articles made using the blends of this invention include cookware, storageware, toys, medical devices, medical containers, healthcare items, sheets, crates, containers, bottles, packaging, wire and cable jacketing, pipes, sporting equipment, chair mats, tubing, profiles, instrumentation sample holders and sample windows, automotive, boat and water craft components, and other such articles. In particular, the compositions are suitable for automotive components such as trim parts, parts for dashboards and instrument panels, mirror housing, body panel, protective side molding, and other interior and external components associated with automobiles, trucks, boats, and other vehicles.

Preferred molded articles comprising the blends of this invention preferably have a 1% Secant flexural modulus of 150,000 psi to 75,000 psi (518 to 1035 MPa), a Gardner Impact Strength at 23° C. of 50 in.lb or more (5.6 J or more), and a Notched Izod Impact Strength at 23° C. of 0.9 ft.lb/in or more (48 J/m or more).

Preferred molded articles comprising the blends of this invention preferably have a 1% Secant flexural modulus at 23° C. under 150,000 psi (1035 MPa), preferably under 100,000 psi (690 MPa), preferably under 80,000 psi (552 MPa) as measured by ASTM D 790A.

Preferred molded articles comprising the blends of this invention preferably have a Gardner Impact Strength at 23° C. of 100 in.lb or more (11.3 J or more), preferably from 100 in.lb to 200 in.lb (11.3 to 22.6 J), preferably greater than 200 in.lb (22.6 J) with all failures being in ductile mode as measured according to ASTM D 5420 on 0.125 inch thick injection molded disks (1 inch=2.54 cm). In a ductile failure mode the specimen deforms plastically before fracturing. The specimen is in one piece after the deformation and the deformed material exhibits plastic flow. Preferred molded articles comprising the blends of this invention preferably have a Gardner Impact Strength at 0 C of 50 in.lb or more (5.6 J or more), preferably from 50 to 100 in.lb or more (5.6 to 11.3 J or more), preferably from 100 to 200 in.lb or more (11.3 to 22.6 J), preferably greater than 200 in.lb (22.6 J) with all failures being in ductile mode as measured according to ASTM D 5420 on 0.125 inch (3.18 mm) thick injection molded disks.

Preferred molded articles comprising the blends of this invention preferably have a Break Elongation during tensile testing at room temperature of greater than 500%, preferably greater than 800%, preferably greater than 900% and more preferably no breaks through 1000% elongation of the sample as measured according to ASTM D1822 on 5 injection molded ASTM specimens.

Preferred molded articles comprising the blends of this invention preferably have a Notched Izod Impact Strength at 0° C. of 0.35 ft.lb/in or more 19 J/m or more), preferably 0.5 ft.lb/in or more (27 J/m or more), preferably 0.75 ft.lb/in or more (40 J/m or more), preferably 1.0 ft.lb/in or more (53 J/m or more), preferably 1.25 ft.lb/in (67 J/m or more), more preferably no breaks during testing.

Preferred molded articles comprising the blends of this invention preferably have a Notched Izod Impact Strength at 23° C. of 0.9 ft.lb/in (48 J/m), preferably 1.5 ft. lb/in (80 J/m), preferably 2 ft.lb/in (107 J/m), preferably 6 ft. lb/in (320 J/m), more preferably no breaks during testing. Notched Izod impact Strength is determined according to ASTM D256, at the specified temperature. A TMI Izod Impact Tester was used. Pairs of specimens were made by cutting injection-molded ASTM D790 "Molding Materials (Thermoplastics and Thermosets)" bars in half. The notch was oriented such that the impact occurred on the notched side of the specimen (following Procedure A of ASTM D256). All breaks were complete, unless specified otherwise.

In another embodiment, the molded articles of the present invention preferably have an Instrumented Impact value at 23° C. of 3 ft.lb (4.1 J), preferably 9 ft.lb (12.2 J), preferably 20 ft.lb (27.1 J), more preferably greater than 20 ft.lb (27.1 J) with all failures being in the ductile mode. Instrumented impact testing was conducted on Dynatup Model 8250 (General Research Corporation, Instruments Div, Santa Barbara, Calif.), with reference to ASTM D 3763. The drop weight used for all the tests was 25 lb, striking the sample at a speed of 15 mph.

Fibers and Non-wovens

The blends of this invention may be formed into fibers and non-wovens. The formation of nonwoven fabrics from polyolefins and their blends generally requires the manufacture of fibers by extrusion followed by bonding of the fibers to form fabric. The extrusion process is typically accompanied by mechanical or aerodynamic drawing of the fibers. The fabric of the present invention may be manufactured by any technique known in the art. Such methods and equipment are well known. For example, spunbond nonwoven fabrics may be produced by spunbond nonwoven production lines produced by Reifenhauser GmbH & Co., of Troisdorf, Germany. The Reifenhasuer system utilizes a slot drawing technique as revealed in U.S. Pat. No. 4,820,142. Fabrics of the present invention demonstrate desirable tensile properties and enhanced softness. Specific embodiments are described as follows.

Conventional Fine Denier Fibers: The three more conventional fiber operations, continuous filament, bulked continuous filament, and staple, are contemplated as application for the fibers of the present invention. For example, the polymer melt is extruded through the holes in the die (spinneret) between, 0.3 mm to 0.8 mm in diameter. Low melt viscosity of the polymer is important and is achieved through the use of high melt temperature (230° C. to 280° C.) and high melt flow rates (15 g/10 min to 40 g/10 min) of the polymers used. A relatively large extruder is usually equipped with a manifold to distribute a high output of molten PP to a bank of eight to twenty spinnerets. Each spinhead is usually equipped with a separate gear pump to regulate output through that spinhead; a filter pack, supported by a "breaker plate;" and the spinneret plate within the head. The number of holes in the spinneret plate determines the number of filaments in a yarn and varies considerably with the different yarn constructions, but it is typically in the range of 50 to 250. The holes are typically grouped into round, annular, or rectangular patterns to assist in good distribution of the quench air flow.

Continuous Filament: Continuous filament yarns typically range from 40 denier to 2,000 denier (denier=number of grams/9000 yd). Filaments can range from 1 to 20 denier per filament (dpf), and the range is growing. Spinning speeds are typically 800 m/min to 1500 m/min (2500 ft/min to 5000 ft/min). An exemplary method would proceed as follows. The filaments are drawn at draw ratios of 3:1 or more (one- or two-stage draw) and wound onto a package. Two-stage drawing allows higher draw ratios to be achieved. Winding speeds are 2,000 m/min to 3,500 m/min (6,600 ft/min to 11,500 ft/min). Spinning speeds in excess of 900 m/min (3000 ft/min) require a narrow MWD to get the best spinnability with the finer filaments. Resins with a minimum MFR of 5 and a NMWD, with a polydispersity index (PI) under 2.8 are typical. In slower spinning processes, or in heavier denier filaments, a 16-MFR reactor grade product may be more appropriate.

Partially Oriented Yarn (POY): Partially oriented yarn (POY) is the fiber produced directly from fiber spinning without solid state drawing (as continuous filament mentioned above). The orientation of the molecules in the fiber is done only in the melt state just after the molten polymer leaves the spinnerett. Once the fiber is solidified, no drawing of the fiber takes place and the fiber is wounded up into a package. The POY yarn (as opposed to fully oriented yarn, or FOY, which has gone through solid state orientation and has a higher tensile strength and lower elongation) tends to have a higher elongation and lower tenacity.

Bulked Continuous Filament: Bulked Continuous Filament fabrication processes fall into two basic types, one-step and two steps. For example, in a two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to 2,500 m/min (8,200 ft/min) or less. As in the two-step CF process, secondary crystallization requires prompt draw texturizing. The most common process today is the one-step spin/draw/text (SDT) process. This process provides better economics, efficiency and quality than the two-step process. It is similar to the one-step CF process, except that the bulking device is in-line. Bulk or texture changes yarn appearance, separating filaments and adding enough gentle bends and folds to make the yarn appear fatter (bulkier).

Staple Fiber: There are two basic staple fiber fabrication processes: traditional and compact spinning. The traditional process typically involves two steps: 1) producing, applying finish, and winding followed by 2) drawing, a secondary finish application, crimping, and cutting into staple. Filaments can range, for example, from 1.5 dpf to >70 dpf, depending on the application. Staple length can be as short as 7 mm or as long as 200 mm (0.25 in. to 8 in.) to suit the application. For many applications the fibers are crimped. Crimping is accomplished by over-feeding the tow into a steam-heated stuffer box with a pair of nip rolls. The overfeed folds the tow in the box, forming bends or crimps in the filaments. These bends are heat-set by steam injected into the box. The MW, MWD, and isotactic content of the resin all affect crimp stability, amplitude, and ease of crimping.

Melt Blown Fabrics: Melt blown fabrics generally refer to webs of fine filaments having fiber diameter in the range of 20 to 0.1 microns. Typical fiber diameters are in the range of 1 to 10 microns and more typically in 1 to 5 microns. The nonwoven webs formed by these fine fiber diameters have very small pore sizes and therefore have excellent barrier properties. For example, in the melt blown process, the extruder melts the polymer and delivers it to a metering melt pump. The melt pump delivers the molten polymer at a steady output rate to the special melt blowing die. As the molten polymer exits the die, they are contacted by high temperature, high velocity air (called process or primary air). This air rapidly draws and, in combination with the quench air, solidifies the filaments. The entire fiber forming process typically takes place within several inches of the die. Die design is the key to producing a quality product efficiently. The fabric is formed by blowing the filaments directly onto a porous forming belt, typically 200 mm to 400 mm (8 in. to 15 in.) from the spinnerets. A larger forming distance may be used for heavier basis weight, higher loft product. Melt blowing requires very high melt flow rate resin typically >200 g/10 min, to obtain the finest possible fibers, although resin MFR as low as 20 g/10 min can be used at a higher processing temperature in other embodiments.

Spunbonded Fabric: Spunbond or spunbonded fibers generally refer to fibers produced, for example, by the extrusion of molten polymer from either a large spinneret having several thousand holes or with banks of smaller spinnerets, for example, containing as few as 40 holes. After exiting the spinneret, the molten fibers are quenched by a cross-flow air quench system, then pulled away from the spinneret and attenuated (drawn) by high speed air. There are generally two methods of air attenuation, both of which use the venturi effect. The first draws the filament using an aspirator slot (slot draw), which runs the width of the spinneret or the width of the machine. The second method draws the filaments through a nozzle or aspirator gun. Filaments formed in this manner are collected on a screen ("wire") or porous forming belt to form the web. The web is then passed through compression rolls and then between heated calender rolls where the raised lands on one roll bond the web at points covering 10% to 40% of its area to form a nonwoven fabric. More information on the spunbond process in general can be obtained from Wadsworth, L. C. and Goswami, B. C., Nonwoven Fabrics: "Spunbonded and Melt Blown Processes", Proceedings of the Eighth Annual Nonwovens Workshop, Jul. 30 to Aug. 3, 1990, sponsored by TANDEC, University of Tennessee at Knoxville.

Annealing may be done after the formation of fiber in continuous filament or fabrication of a non-woven material from the fibers. Annealing partially relieves the internal stress in the stretched fiber and restores the elastic recovery properties of the blend in the fiber. Annealing has been shown to lead to significant changes in the internal organization of the crystalline structure and the relative ordering of the semi-amorphous and semicrystalline phases. This leads to recovery of the elastic properties. For example, annealing the fiber at a temperature of at least 40° C., above room temperature (but slightly below the crystalline melting point of the blend) is adequate for the restoration of the elastic properties in the fiber. Thermal annealing of the polymer blend is conducted by maintaining the polymer blends or the articles made from a such a blend at temperature, for example, between room temperature to a maximum of 160° C. or alternatively to a maximum of 130° C. for a period between a few seconds to less than 1 hour. A typical annealing period is 1 to 5 min. at 100° C. The annealing time and temperature can be adjusted for any particular blend. In other embodiments, the annealing temperature ranges from 60° C. to 130° C. In another embodiment, the temperature is about 100° C. In certain embodiments, for example, conventional continuous fiber spinning, annealing can be done by passing the fiber through a heated roll (godet), without the application of conventional annealing techniques. Annealing should be under the very low fiber tension to allow shrinking of the fiber in order to impart elasticity to the fiber. In nonwoven processes, the web usually passes through a calender to point bond (consolidate) the web. The passage of the unconsolidated nonwoven web through a heated calender at relatively high temperature is sufficient to anneal the fiber and increase the elasticity of the nonwoven web. Similar to fiber annealing, the nonwoven web should be under low tension to allow for shrinkage of the web in both machine direction (MD) and transverse direction (TD) to enhance the elasticity of the nonwoven web. In other embodiments, the bonding calender roll temperature ranges from 100° C. to 130° C. In another embodiment, the temperature is about 100° C. The annealing temperature can be adjusted for any particular blend.

In other embodiments, the nonwoven fabrics of the present invention require little to no post fabrication processing. In another embodiment, the fabrics of the present invention are annealed in a single-step by a heated roll (godet) during calendering under low tension.

In a preferred embodiment, this invention relates to nonwoven articles formed from one or more of the blends above where the blend has a permanent set of greater than 65%, and when the blend is formed into a non-woven, where the non-woven has: a Hand of 40 g or less (at 35 gsm basis weight), an optimum bonding temperature at least 5 F (~3 C) lower than a similar non-woven from the neat polypropylene component of the blend and adequate fabric formation (ie. uniformity of distribution of fibers that form the fabric) and non-woven processing (ie. the ability to maintain commercially competitive output rates characteristic of propylene homopolymers and copolymers used in the industry today).

As used herein, the softness of a nonwoven fabric is measured according to the "Handle-O-Meter" test as specified in operating manual on Handle-O-Meter model number 211-5 from the Thwing-Albert Instrument Co., 10960 Dutton Road, Phila., Pa., 19154. The Handle-O-Meter reading is in units of grams. The modifications are: 1. Two specimens per sample were used and 2. Readings are kept below 100 gram by adjusting the slot width used and the same slot width is generally used through out the whole series of samples being compared, preferably 10 mm. The lower the Hand value, the softer and more aesthetically pleasing the fabric and the better the drapeability of the fabric, features more generally associated with cloth than with plastic polypropylene fabrics. Soft fabrics are highly desired in many applications, particularly in hygiene and other similar consumer applications and medical applications, where contact with the human body is involved. In a preferred embodiment, the non-wovens of this invention have a Hand (for 35 gsm basis weight fabrics) of 35 g or less, preferably 25 g or less, more preferably 15 g or less.

In another embodiment, nonwoven articles made from the compositions of this invention (preferably where the semi-amorphous polymer comprises from 5 to 12 wt % comonomer and is present at from 25 to 40 wt %), preferably have at 35 g/sq m a hand value of 15 to 25 g, a transverse direction peak force greater than 7 g, a machine direction tear strength greater than 500 g, and an optimum bonding temperature 5 to 10° F. (~3 to 6° C.) lower than that of the same article made from the same composition except that the semi-amorphous polymer is absent.

Fabric, fiber tensile properties, including Peak Force and Peak Elongation in the machine direction (MD) and transverse or cross direction (TD) and properties based on fabric (or fiber) tensile properties, like Optimum bonding temperature, were measured with reference to ASTM standard D 1682-64, with the following modifications: 1) the distance between the two fabric clamps was 5 inch (12.7 cm) instead of 3 inch (7.62 cm), 2) a metallic arc type upper line grip and a flat lower rubber grip were used instead of a flat metallic upper and lower grip, 3) crossbeam speed of travel was 5 in/min (127 mm/min) instead of 12 inch/min (305 mm/min), and 4) 6 MD and 6 TD specimen measurements instead of 5 MD and 8 TD. For fabric testing, 1 inch (25.4 mm) wide strips were cut along both the MD and TD. The values reported were averages over the six sample measurements. Machine direction tear strength was measured with reference to ASTM standard D-1922.

In another embodiment, in addition to the soft hand, good fabric formation, easy runnability on commercial nonwoven equipment, and a lowering of the optimum bonding temperature, the blend fabrics displayed satisfactory tensile properties and MD tear resistance.

In another embodiment, this invention relates to:
1. A film comprising a homogeneous blend of:
  1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less preferably the semi-crystalline polymer is a homopolymer, preferably of propylene); and
  2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:
    a) 10 to 50 percent crystallinity;
    b) a melt flow rate of 200 dg/min or less;
    c) a DSC melting point (second melt Tm) of 130° C. or less;
    d) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
    e) an Mw/Mn of 1.5 to 4,
    f) a triad tacticity of three propylene units, as measured by $^{13}$C NMR, of 75% or greater, where the blend has:
    i) a melt flow rate of 0.5 to 100 dg/min; and
    ii) less than 5 weight % filler, based upon the weight of the polymers and the filler; and
    iii) a permanent set of greater than 65%; and where the film has:
    1) a thickness of 2.5 to 635 microns;
    2) a haze of 10% or less, prior to addition of clarifying or nucleating agents;
    3) a 45 degree gloss of 85 or more;
    4) a 1% Secant tensile modulus of 860 to 205 MPa;
    5) an Elmendorf tear in the machine direction of 1.57 g/micron or more;
    6) an Elmendorf tear in the transverse direction of 1.57 g/micron or more; and
    7) a total energy impact at 23° C. of 2.7 J or more.
2. The film of paragraph 1 wherein the difference in comonomer content is no greater than 10 weight %.
3. The film of paragraph 1 or 2 wherein the composition distribution of the semi-amorphous copolymer is 90 or more.
4. The film of any of paragraphs 1 to 3 wherein the film has a machine direction Elmendorf Tear or 2.16 g/micron or greater.
5. The film of any of paragraphs 1 to 4 wherein the film has a Total energy impact of 4 J or greater.
6. The film of any of paragraphs 1 to 5 wherein the film has a Puncture Energy of 0.12 J/micron or greater.
7. The film of any of paragraphs 1 to 6 wherein the film has a 1% Secant tensile modulus of 518 MPa or lower.
8. The film of any of paragraphs 1 to 7 wherein the film has a haze of 5% or less, preferably 4% or less, preferably 3% or less, preferably 2% or less, preferably 1% or less, preferably 0.5% or less.

9. The film of any of paragraphs 1 to 8 wherein the film has a 45 degree gloss of 88 units or greater, preferably 90 units or greater.
10. The film of any of paragraphs 1 to 9 wherein the film has a 1% secant tensile modulus of 690 MPa or less, an MD Elmendorf Tear of 1.77 g/micron or more, a haze of 2% or lower, a 45 degree gloss of 88 units or higher, and a Total energy impact at 23° C. of 4 J or greater.
11. The film of any of paragraphs 1 to 10 wherein the film has a 1% secant tensile modulus of 518 MPa or lower, an MD Elmendorf tear of 2.16 g/microns or greater, a haze of 2% or lower, a 45 degree gloss of 88 units or higher, and a Total energy impact at 23° C. of 4.75 J or greater.
12. The film of any of paragraphs 1 to 11 wherein the blend has a permanent set of 85% or greater, preferably 100% or greater, preferably 150% or greater.
13. A molded article comprising a homogeneous blend of:
    1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 200 dg/min or less; and
    2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:
        a) 10 to 50 percent crystallinity or less;
        b) a melt flow rate of 200 dg/min or less;
        c) a DSC melting point (second melt Tm) of 130° C. or less;
        d) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
        e) an Mw/Mn of 1.5 to 4,
        f) a triad tacticity of three propylene units, as measured by $^{13}$C NMR, of 75% or greater,
    where the blend has:
        i) a melt flow rate of 0.5 to 200 dg/min; and
        ii) less than 5 weight % filler, based upon the weight of the polymers and the filler; and
        iii) a permanent set of greater than 65%; and
        iv) a haze of 12% or less measured on a 1 mm thick injection molded chip,
    where the molded article has:
        1) a thickness of 250 µm to 10 mm;
        2) a 1% Secant Flexural Modulus at 23° C. of 1035 MPa or less;
        3) a Gardner Impact Strength at 23° C. of 11.3 J or more; and
        4) a Gardner Impact Strength at 0° C. of 50 5.6 J or more.
14. The molded article of paragraph 13 wherein the molded article has a Notched Izod Impact Strength at 23° C. of 53 J/m or more.
15. The molded article of paragraph 13 or 14 wherein the molded article has a Gardner Impact Strength at 23° C. of 22.6 J or more.
16. The molded article of any of paragraphs 13 to 15 wherein the molded article has a Notched Izod Impact Strength at 23° C. of 80 J/m or more.
17. The molded article of any of paragraphs 13 to 16 wherein the molded article has a Gardner Impact Strength at 23° C. of 22.6 J or more with failure being in ductile mode.
18. The molded article of any of paragraphs 13 to 17 wherein the molded article has an Ultimate Elongation at 23° C. of 1000% or more.
19. The molded article of any of paragraphs 13 to 18 where the difference in comonomer content is no greater than 10 weight %.
20. The molded article of any of paragraphs 13 to 19 wherein the intermolecular composition distribution of the semi-amorphous copolymer is 90% or more.
21. The molded article of any of paragraphs 13 to 20 wherein the intermolecular composition distribution of the semi-amorphous copolymer is 90% or more and the difference in comonomer content is no greater than 10 weight %.
22. The molded article of any of paragraphs 13 to 21 wherein the molded article has a 1% secant flexural modulus at 23° C. of less than 690 MPa.
23. The molded article of any of paragraphs 13 to 22 wherein the blend has a haze of less than 10%, preferably less than 7.5%, preferably less than 6%.
24. The molded article of any of paragraphs 13 to 23 wherein the molded article has a 1% secant flexural modulus at 23° C. of less than 690 MPa, an ultimate elongation at 23° C. of greater than 1000%, a Gardner at both 23° C. and 0° C. of greater than 22.6 J, an Instrumented impact at both 23° C. and 0° C. of greater than 27.1 J.
25. The molded article of any of paragraphs 13 to 24 wherein the molded article has a 1% secant flexural modulus less than 690 MPa, a notched Izod impact strength at 23° C. of greater than 80 J/m, an Instrumented impact at both 23° C. and 0° C. of greater than 27.1 J where failures are all in ductile mode.
26. The molded article of any of paragraphs 13 to 25 wherein the blend has permanent set of 85% or greater.
27. The molded article of any of paragraphs 13 to 26 wherein the blend has permanent set of 150% or greater.
28. The molded article of any of paragraphs 13 to 27 where in the semi-crystalline polymer is a propylene homopolymer.
29. The molded article of any of paragraphs 13 to 28 wherein the semi-amorphous polymer has a heat of fusion of from 10 to 40 J/g.
30. The molded article of any of paragraphs 13 to 29 wherein the semi-crystalline polymer has a melting point of from 125 to 160° C.
31. The molded article of any of paragraphs 13 to 30 wherein the semi-amorphous polymer has a melting point of from 35 to 100° C.
32. A non-woven comprising a homogeneous blend of:
    1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 170° C. and a melt flow rate of 2000 dg/min or less (preferably the semi-crystalline polymer is a homopolymer, preferably of propylene); and
    2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:
- a) less than 50 percent crystallinity;
- b) a melt flow rate of 2000 dg/min or less;
- c) a DSC melting point (second melt Tm) of 130° C. or less;
- d) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer and
- e) an Mw/Mn of 1.5 to 4,
- f) a triad tacticity of three propylene units, as measured by $^{13}$C NMR, of 75% or greater, where the blend has:
- i) a melt flow rate of 1 to 2000 dg/min; and
- ii) less than 5 weight % filler, based upon the weight of the polymers and the filler,
- iii) a permanent set of greater than 65%; and
- iv) a haze of 12% or less measured on a 1 mm thick injection molded chip where the non-woven has:
- 1) a Hand of 40 g or less for 35 g/sm fabrics;
- 2) an optimum bonding temperature at least 5° C. lower than the optimum bonding temperature for the same non-woven article made from the same composition except that the semi-amorphous copolymer is absent.

33. The non-woven of claim 32 wherein the nonwoven has a hand on 35 g/sm fabric of 30 g or less, preferably 20 g or less, preferably 15 g or less.

34. The non-woven of paragraph 32 or 33 wherein the non-woven has an optimum bonding temperature at least 7.5° C. lower than the optimum bonding temperature for the same nonwoven made from the same composition except that the semi-amorphous copolymer is absent.

35. The non-woven of any of paragraphs 32 to 34 wherein the nonwoven has an optimum bonding temperature at least 10° C. lower than the optimum bonding temperature for the same nonwoven made from the same composition except that the semi-amorphous copolymer is absent, preferably at least 12.5° C. lower, preferably at least 15° C. lower, preferably at least 17.5° C. lower, preferably at least 20° C. lower.

36. The non-woven of any of paragraphs 32 to 35 wherein at 35 g/sm the non-woven has a hand of 30 g or lower and a TD peak tensile load under optimum bonding of 3180 g force or greater.

37. The non-woven of any of paragraphs 32 to 36 wherein the difference in comonomer content is no greater than 10 weight %.

38. The non-woven of any of paragraphs 32 to 37 wherein the intermolecular composition distribution of the semi-amorphous copolymer is 90% or more.

39. The non-woven of any of paragraphs 32 to 38 wherein the intermolecular composition distribution of the semi-amorphous copolymer is 90% or more and the difference in comonomer content is no greater than 10 weight %.

40. The non-woven of any of paragraphs 32 to 39 wherein the blend has a haze of less than 10%, preferably less than 7.5%, preferably less than 6%.

41. The non-woven of any of paragraphs 32 to 40 wherein the blend comprises from 1 to 5000 ppm of a slip agent.

42. The non-woven of any of paragraphs 32 to 41 wherein the blend comprises a nucleating agent.

43. The non-woven of any of paragraphs 32 to 42 wherein the blend further comprises nucleating agent selected from the group consisting of adipic acid, benzoic acid, or metal salts of these acids, sorbitols, and 3,4-dimethylbenzylidene sorbitol.

44. A homogeneous polymer blend comprising:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 160° C. and a melt flow rate of 50 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:
- a) 8 to 35 percent crystallinity or less;
- b) a melt flow rate of 1 to 50 dg/min;
- c) a DSC melting point (second melt Tm) of 90° C. or less;
- d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
- e) an Mw/Mn of 1.5 to 4,
- f) a triad tacticity of three propylene units, as measured by $^{13}$C NMR, of 75% or greater, and
- g) the blend comprises less than 5 weight % filler, based upon the weight of the polymers and the filler, where the blend has:
- a) a permanent set of greater than 65%;
- b) a haze of 20% or less;
- c) a melt flow rate of 1 to 50 dg/min; and
- d) optionally, a heat deflection temperature of 45° C. or more.

45. The composition of paragraph 44 the intermolecular composition distribution of the semi-amorphous copolymer is 85% or more, preferably 90% or more and the difference in comonomer content is no greater than 20% preferably no greater than 10 weight %.

46. The composition of paragraph 44 or 45 wherein the blend has a permanent set of 85% or greater, preferably 100% or greater, preferably 150% or greater.

47. The composition of any of paragraphs 44 to 46 wherein the blend comprises from 1 to 5000 ppm of a slip agent.

48. The composition of any of paragraphs 44 to 47 wherein the blend comprises a nucleating agent.

49. The composition of any of paragraphs 44 to 48 wherein the semi-crystalline polymer comprises propylene and from 1 to 3 weight % of one or more comonomers selected from the group consisting of ethylene, butene, pentene, hexene, heptene, octene, nonene, and decene.

50. The composition of any of paragraphs 44 to 49 wherein the semi-crystalline polymer is a propylene homopolymer.

51. The composition of any of paragraphs 44 to 50 wherein the semi-amorphous polymer has a heat of fusion of from 10 to 40 J/g.

52. The composition of any of paragraphs 44 to 51 wherein the semi-amorphous polymer has a melting point of from 35 to 100° C.

53. A film comprising a homogeneous polymer blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 160° C. and a melt flow rate of 50 dg/min or less; and 2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:

a) 8 to 35 percent crystallinity or less;
b) a melt flow rate of 1 to 50 dg/min;
c) a DSC melting point (second melt Tm) of 90° C. or less;
d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
e) an Mw/Mn of 1.5 to 4,
f) a triad tacticity of three propylene units, as measured by $^{13}$C NMR, of 75% or greater, and
g) the blend comprises less than 5 weight % filler, based upon the weight of the polymers and the filler, where the blend has:
a) a permanent set of greater than 65%;
b) a haze of 20% or less;
c) a melt flow rate of 0.5 to 100 dg/min, and where the film has:
1) a thickness of 0.1 to 25 mils (2.5 to 635 microns);
2) a haze of 20% or less, prior to addition of clarifying or nucleating agents;
3) a 1% Secant flexural modulus of 860 to 205 MPa;
4) an Elmendorf tear in the machine direction 1.57 g/micron or more;
5) an Elmendorf tear in the transverse direction of 1.57 g/micron or more; and
6) a total energy impact at 23° C. of 2.7 J or more.

54. The film of paragraph 53 wherein the difference in comonomer content is no greater than 10 weight %

55. The film of paragraph 53 or 54 the intermolecular composition distribution of the semi-amorphous copolymer is 90% or more.

56. The film of any of paragraphs 53 to 55 wherein the film has a machine direction Elmendorf Tear or 2.16 g/micron or greater.

57. The film of any of paragraphs 53 to 56 wherein the film has a Total energy impact of 4 J or greater.

58. The film of any of paragraphs 53 to 57 wherein the film has a Puncture Energy of 0.12 J/micron or greater.

59. The film of any of paragraphs 53 to 58 wherein the film has a 1% Secant tensile modulus of 518 MPa or lower.

60. The film of any of paragraphs 53 to 59 wherein the film has a haze of 5% or less, preferably 2% or less, preferably 1% or less.

61. The film of any of paragraphs 53 to 60 wherein the film has a 45 degree gloss of 88 units or greater.

62. The film of any of paragraphs 53 to 61 wherein the film has a 1% secant tensile modulus of 690 MPa or less, an MD Elmendorf Tear of 1.77 g/micron or more, a haze or 2% or lower, a 45 degree gloss of 88 units or higher, and a Total energy impact at 23° C. of 4 J or greater.

63. The film of any of paragraphs 53 to 63 wherein the film has a 1% secant tensile modulus of 518 MPa or lower, an MD Elmendorf tear of 2.16 g/microns or greater, a haze of 2% or lower, a 45 degree gloss of 88 units or higher, and a Total energy impact at 23° C. of 4.75 J or greater.

64. The film of any of paragraphs 53 to 63 wherein the blend has a permanent set of 85% or greater, preferably 100% or greater, preferably 150% or greater.

65. The film of any of paragraphs 53 to 64 wherein the blend comprises from 1 to 5000 ppm of a slip agent.

66. The film of any of paragraphs 53 to 65 wherein the blend comprises a nucleating agent.

67. The film of any of paragraphs 53 to 66 wherein the semi-crystalline polymer comprises propylene and from 1 to 3 weight % of one or more comonomers selected from the group consisting of ethylene, butene, pentene, hexene, heptene, octene, nonene, and decene.

68. The film of any of paragraphs 53 to 67 wherein the semi-crystalline polymer is a propylene homopolymer.

69. The film of any of paragraphs 53 to 68 wherein the semi-amorphous polymer has a heat of fusion of from 10 to 40 J/g.

70. The film of any of paragraphs 53 to 69 wherein the semi-amorphous polymer has a melting point of from 35 to 100° C.

71. A fiber comprising a homogeneous polymer blend comprising:

1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 160° C. and a melt flow rate of 50 dg/min or less; and 2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:

a) 8 to 35 percent crystallinity;
b) a melt flow rate of 1 to 50 dg/min;
c) a DSC melting point (second melt Tm) of 90° C. or less;
d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
e) an Mw/Mn of 1.5 to 4; and
f) a triad tacticity of three propylene units, as measured by $^{13}$C NMR, of 75% or greater, where the blend:
1) comprises less than 5 weight % filler, based upon the weight of the polymers and the filler;
2) has a permanent set of greater than 65%;
3) has a haze of 20% or less; and
4) has a melt flow rate of from 1 to 50 dg/min, and where the fiber has:
1) a Hand of 40 g or less when converted into spunbond fabric of 35 g/sm fabrics basis weight.

72. A non-woven comprising a homogeneous polymer blend comprising:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 160° C. and a melt flow rate of 50 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:
  a) 8 to 35 percent crystallinity;
  b) a melt flow rate of 1 to 50 dg/min;
  c) a DSC melting point (second melt Tm) of 90° C. or less;
  d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
  e) an Mw/Mn of 1.5 to 4,
  f) a triad tacticity of three propylene units, as measured by $^{13}$C NMR, of 75% or greater, and
  g) the blend comprises less than 5 weight % filler, based upon the weight of the polymers and the filler, where the blend has:
  a) a permanent set of greater than 65%;
  b) a haze of 20% or less; and
  c) melt flow rate of 1 to 2000 dg/min, and and where the non-woven has:
1) a Hand of 40 g or less for 35 g/sm fabrics;
2) an optimum bonding temperature at least 5° C. lower than the optimum bonding temperature for the same non-woven article made from the same composition except that the semi-amorphous copolymer is absent.

73. The non-woven of paragraph 72 wherein the nonwoven has a hand on 35 g/sm fabric of 30 g or less, preferably 20 g or less, preferably 15 g or less.

74. The non-woven of paragraph 72 or 73 wherein the non-woven has an optimum bonding temperature at least 7.5° C. lower than the optimum bonding temperature for the same nonwoven made from the same composition except that the semi-amorphous copolymer is absent.

75. The non-woven of any of paragraphs 72 to 74 wherein the nonwoven has an optimum bonding temperature at least 10° C. lower than the optimum bonding temperature for the same nonwoven made from the same composition except that the semi-amorphous copolymer is absent, preferably at least 12.5° C. lower, preferably at least 15° C. lower, preferably at least 17.5° C. lower, preferably at least 20° C. lower.

76. The non-woven of any of paragraphs 72 to 75 wherein at 35 g/sm the non-woven has a hand of 30 g or lower and a TD peak tensile load under optimum bonding of 3180 g force or greater.

77. The fiber of paragraph 71 or the non-woven of any of paragraphs 72 to 76 the difference in comonomer content is no greater than 10 weight %.

78. The fiber of paragraph 71 or the non-woven of any of paragraphs 72 to 77 wherein the intermolecular composition distribution of the semi-amorphous copolymer is 90% or more.

79. The fiber of paragraph 71 or the non-woven of any of paragraphs 72 to 78 wherein the intermolecular composition distribution of the semi-amorphous copolymer is 90% or more and the difference in comonomer content is no greater than 10 weight %.

80. The fiber of paragraph 71 or the non-woven of any of paragraphs 72 to 79 wherein the blend has a haze of less than 10%, preferably less than 7.5%, preferably less than 6%.

81. The fiber of paragraph 71 or the non-woven of any of paragraphs 72 to 80 wherein the blend comprises from 1 to 5000 ppm of a slip agent.

82. The fiber of paragraph 71 or the non-woven of any of paragraphs 72 to 81 wherein the blend comprises a nucleating agent selected from the group consisting of adipic acid, benzoic acid, or metal salts of these acids, sorbitols, and 3,4-dimethylbenzylidene sorbitol.

83. A molded article comprising a homogeneous polymer blend comprising:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 160° C. and a melt flow rate of 50 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more C2 and or C4 to C10 alpha-olefin comonomers, said semi-amorphous polymers each having:
  a) 8 to 35 percent crystallinity;
  b) a melt flow rate of 1 to 50 dg/min;
  c) a DSC melting point (second melt Tm) of 90° C. or less;
  d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
  e) an Mw/Mn of 1.5 to 4,
  f) a triad tacticity of three propylene units, as measured by $^{13}$C NMR, of 75% or greater, and
  g) the blend comprises less than 5 weight % filler, based upon the weight of the polymers and the filler, where the blend has:
   i) a melt flow rate of 0.5 to 200 dg/min; and
   ii) optionally, less than 5 weight % filler, based upon the weight of the polymers and the filler; and
      iii) a permanent set of greater than 65%; and
      iv) a haze of 12% or less measured on a 1 mm thick injection molded chip; and
      v) optionally, a heat deflection temperature of 45° C. or more,
where the molded article has:
   1) a thickness of 250 µm to 10 mm;
   2) a 1% Secant Flexural Modulus at 23° C. of 1035 MPa or less;
   3) a Gardner Impact Strength at 23° C. of 11.3 J or more; and
   4) a Gardner Impact Strength at 0° C. of 5.6 J or more.

84. The molded article of paragraph 83 wherein the molded article has a Notched Izod Impact Strength at 23° C. of 53 J/m or more.

85. The molded article of paragraph 83 or 84 wherein the molded article has a Gardner Impact Strength at 23° C. of 22.6 J or more.

86. The molded article of any of paragraphs 83 to 85 wherein the molded article has a Notched Izod Impact Strength at 23° C. of 80 J/m or more.

87. The molded article of any of paragraphs 83 to 86 wherein the molded article has a Gardner Impact Strength at 23° C. of 22.6 J or more with failure being in ductile mode.

88. The molded article of any of paragraphs 83 to 87 wherein the molded article has an Ultimate Elongation at 23° C. of 1000% or more.

89. The molded article of any of paragraphs 83 to 88 wherein the difference in comonomer content is no greater than 10 weight %.

90. The molded article of any of paragraphs 83 to 89 the intermolecular composition distribution of the semi-amorphous copolymer is 90% or more.

91. The molded article of any of paragraphs 83 to 90 wherein the intermolecular composition distribution of the semi-amorphous copolymer is 90% or more and the difference in comonomer content is no greater than 10 weight %.

92. The molded article of any of paragraphs 83 to 91 wherein the molded article has a 1% secant flexural modulus at 23° C. of less than 690 MPa.

93. The molded article of any of paragraphs 83 to 92 wherein the blend has a haze of less than 10%, preferably less than 7.5%, preferably less than 6%.

94. The molded article of any of paragraphs 83 to 93 wherein the molded article has a 1% secant flexural modulus at 23° C. of less than 690 MPa, an ultimate elongation at 23° C. of greater than 1000%, a Gardner at both 23° C. and 0° C. of greater than 22.6 J, an Instrumented impact at both 23° C. and 0° C. of greater than 27.1 J.

95. The molded article of any of paragraphs 83 to 94 wherein the molded article has a 1% secant flexural modulus less than 690 MPa, a notched Izod impact strength at 23° C. of greater than 80 J/m, an Instrumented impact at both 23° C. and 0° C. of greater than 27.1 J where failures are all in ductile mode.

96. The molded article of any of paragraphs 83 to 95 wherein the blend has permanent set of 85% or greater, preferably 100% or greater, preferably 125% or greater, preferably 150% or greater.

97. The molded article of any of paragraphs 83 to 96 where in the semi-crystalline polymer is a propylene homopolymer.

98. The molded article of any of paragraphs 83 to 97 wherein the semi-amorphous polymer has a heat of fusion of from 10 to 40 J/g.

99. The molded article of any of paragraphs 83 to 98 wherein the semi-crystalline polymer has a melting point of from 125 to 160° C.

100. The molded article of any of paragraphs 83 to 99 wherein the semi-amorphous polymer has a melting point of from 35 to 100° C.

EXAMPLES

Mw, Mn, Mz were measured by Gel Permeation Chromatography, as described above.

Mooney Viscosity is measured according to ASTM D 1646.

Melt flow rate (MFR) was measured according to ASTM D 1238 condition L at 230° C. under a load of 2.16 kg.

Ethylene weight % was measured as follows. A thin homogeneous film was pressed at a temperature of about 150° C. or greater, then mounted on a Perkin Elmer PE 1760 infrared spectrophotometer. A full spectrum of the sample from 600 $cm^{-1}$ to 4000 $cm^{-1}$ was recorded and the monomer weight percent of ethylene was calculated according to the following equation: Ethylene wt %=82.585−111.987X+ 30.045 $X^2$, wherein X is the ratio of the peak height at 1155 $cm^{-1}$ and peak height at either 722 $cm^{-1}$ or 732 $cm^{-1}$, whichever is higher.

Glass Transition Temperature (Tg), β relaxation, Loss Modulus (E") and Storage Modulus (E') were measured by dynamic mechanical thermal analysis (DMTA). The instrument used was the RSA II, Rheometrics Solid Analyzer II from TA Instruments, New Castle, Del. The instrument was operated in tension mode and used molded rectangular samples. Sample conditions were: 0.1% strain, 1 Hz frequency, and 2 degree C. per minute heating rate, covering the temperature range from −135 C to the melting point of the sample. Samples were molded at about 200 C. Typical sample dimensions were 23 mm length×6.4 mm width×thickness between 0.25 mm and 0.7 mm, depending on the sample. tanδ is the ratio of E"/E', where E' is the Storage Modulus and E" is the Loss Modulus. The output of these DMTA experiments is the storage modulus (E') and loss modulus (E"). The storage modulus measures the elastic response or the ability of the material to store energy, and the loss modulus measures the viscous response or the ability of the material to dissipate energy. The ratio of E"/E' (=tan[δ]) gives a measure of the damping ability of the material. Energy dissipation mechanisms (i.e., relaxation modes) show up as peaks in tan[δ], and are associated with a drop in E' as a function of temperature. The uncertainty associated with reported values of E' is expected to be on the order of ±10%, due to variability introduced by the molding process.

Crystallization temperature (Tc), melting temperature ($T_m$) and heat of fusion (Hf, ΔH, or $ΔH_f$) were measured using Differential Scanning Calorimetry (DSC). This analysis was conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded-in orientation or stresses.

The sample was then held for 10 minutes at this temperature to destroy its thermal history. Crystallization data was acquired by cooling the sample from the melt to at least 50° C. below the crystallization temperature at a cooling rate of 10° C./min. Typically, the blend samples were cooled down to −25 C. The sample was then held at this temperature for 10 minutes, and finally heated at 10° C./min to acquire additional melting data (second heat). The blend melting temperatures reported in the tables are the peak melting temperatures from the second heat unless otherwise indicated. For polymers displaying multiple peaks, the higher melting peak temperature is reported. Areas under the curve were used to determine the heat of fusion ($\Delta H_f$) which can be used to calculate the degree of crystallinity. A value of 189 J/g was used as the equilibrium heat of fusion for 100% crystalline polypropylene. The percent crystallinity of a propylene polymer is calculated using the formula, [area under the curve (J/g)/189 (J/g)]*100.

Blend haze (both total and internal) was measured according to ASTM D-1003 on a 1 mm thick injection molded haze chip sample. 2500 ppm of bis-3,4dimethylbenzylidenesorbitol (also called DMDBS and available as Millad 3988 from Milliken Chemicals) were combined with the blend prior to molding into the 1 mm chip sample. While the inventive blends are combined with a clarifying agent for haze testing, the final articles (films, molded parts, fibers, nonwovens, others) of the invention may or may not contain clarifying or nucleating agent(s). The haze of the final articles was also measured according to ASTM D-1003. Internal haze refers to the inherent haze level of the film or molded article, excluding any surface-related contribution. The surface(s) is coated with an ASTM-approved inert liquid to eliminate any contribution to haze from surface topology effects. The resulting haze value is termed internal haze. Haze measurements that include surface topology effects are referred to as total haze. Unless particularly specified, the haze levels reported here are total haze values.

Example 1

Copolymerization to Form the Semi-Amorphous Propylene-Ethylene Copolymers (SAPEC)

Continuous polymerization was conducted in a 9 liter continuous flow stirred tank reactor using hexane as the solvent. The liquid full reactor had a residence time of 9 minutes and the pressure was maintained 700 kPa. A mixed feed of hexane, ethylene and propylene was pre-chilled to approximately −30° C. to remove the heat of polymerization, before entering the reactor. A solution of catalyst/activator in toluene and the scavenger in hexane were separately and continuously admitted into the reactor to initiate the polymerization. The reactor temperature was maintained between 35 and 50° C., depending on the target molecular weight. The feed temperature was varied, depending on the polymerization rate to maintain a constant reactor temperature. The polymerization rate was varied from 0.5 kg/hr to 4 kg/hr. Hexane at 30 kg/hr was mixed with ethylene at 717 g/hr and propylene at 5.14 kg/hr and fed to the reactor. By altering the levels of ethylene and propylene feeds to the reactor, different polymer compositions could be obtained. The polymerization catalyst, dimethyl silyl bridged bis-indenyl hafnium dimethyl activated 1:1 molar ratio with N',N'-dimethyl anilinium-tetrakis(pentafluorophenyl)borate was introduced at the rate of 0.0135 g/hr. A dilute solution of triisobutyl aluminum was introduced into the reactor as a scavenger of catalyst terminators: a rate of approximately 111 mole of scavenger per mole of catalyst was adequate for this polymerization. After five residence times of steady polymerization, a representative sample of the polymer produced in this polymerization was collected. The solution of the polymer was withdrawn from the top and then steam distilled to isolate the polymer. The polymerization rate was measured at 3.7 kg/hr. All the semi-amorphous propylene-ethylene copolymers (SAPECs) of this invention have ethylene and propylene feeds adjusted to produce copolymers with ethylene incorporation in the range of 5 wt % to 12 wt %. Molecular weight of the polymer was varied by either changing the reactor temperature or by changing the ratio of total monomer feed rate to the polymerization rate. Dienes for terpolymerization were added to the mixed feed stream entering the reactor by preparing the diene in a hexane solution and metering it in the required volumetric amount.

In the manner described in Example 1 above, a semi-amorphous propylene-ethylene copolymer (SAPEC-1), was synthesized. This copolymer was used to prepare inventive blends, as will be described later. Also shown in Table 1 are other SAPECs that were synthesized per the polymerization procedure outlined above. Some of these have ethylene comonomer incorporation between 5 and 12 wt %, while others have ethylene content above 12 wt % (inventive semi-amorphous propylene ethylenecopolymers). Characterization data are shown in Table 1.

The semi-amorphous propylene-ethylene copolymers, which are derived from chiral metallocene-based catalysts, have a narrow inter and intramolecular composition distribution. The intermolecular composition distribution of the polymer was determined by thermal fractionation in hexane as follows: about 30 g of the crystallizable propylene-ethylene copolymer was cut into small cubes about ⅛th inch (0.32 cm) on the side and then introduced into a thick-walled glass bottle closed with screw cap along with 50 mg of Irganox 1076 antioxidant (Ciba-Geigy Corpn). 425 ml of hexane (a principal mixture of normal and iso-isomers) was added to the contents of the bottle and the sealed bottle was maintained at 23° C. for 24 hours. At the end of this period, the solution was decanted and the residue was treated with additional hexane for an additional 24 hours. At the end of this period, the two hexane solutions were combined and evaporated to yield a residue of the polymer soluble at 23° C. To the residue was added sufficient hexane to bring the volume to 425 ml and the bottle was maintained at 31° C. for 24 hours in a covered circulating water bath. The soluble polymer was decanted and an additional amount of hexane is added for another 24 hours at 31° C., prior to decanting. In this manner, fractions of the semi-amorphous propylene-ethylene copolymer soluble at 40° C., 48° C., 55° C. and 62° C. were obtained, at temperature increases of approximately 8° C. between stages. The soluble polymers were dried, weighed and analyzed for composition, as wt % ethylene content, by the IR technique described above. Soluble fractions obtained in the adjacent temperature increases are the adjacent fractions in the specification above. Data on different representative semi-amorphous propylene-ethylene copolymers are shown in Tables 2 and 3. EPR in Table 2 is an ethylene propylene rubber that does not contain crystallizable propylene species like the semi-amorphous copolymers. This EPR has 47% ethylene, a Mooney viscosity (ML 1+8 at 127 C) of 28 and a GPC polydispersity (Mw/Mn) of 2.3. It was obtained under the tradename Vistalon™ 457-by ExxonMobil Chemical in Houston, Tex.

TABLE 1

Characterization of Semi-Amorphous Propylene-Ethylene Copolymers

| SAPEC | ML (1 + 4) at 125° C. | Mw# | Mn# | Mz# | Ethylene Wt %* | DSC Tm ° C. | ΔH melt J/g |
|---|---|---|---|---|---|---|---|
| SAPEC-1 | 8.9** | 163890 | 94910 | 246355 | 10.7 | 66.1 | 26.4 |
| SAPEC-3 | 14 | 248900 | 102000 | | 7.3 | 84.7 | |
| SAPEC-4 | 23.9 | 265900 | 124700 | | 11.6 | 43.0 | |
| SAPEC-5 | 33.1 | 318900 | 121900 | | 16.4 | 42.2 | |
| SAPEC-6 | 34.5 | | | | 11.1 | 63.4 | |
| SAPEC-7 | 38.4 | | | | 14.7 | 47.8 | |

**MFR values (dg/min) by ASTM D-1238 Cond L
GPC data in daltons
*Ethylene wt % measured by IR procedure described earlier.
DSC data are on 1st melting of conditioned sample (120 hrs at ambient temperature); Tm is peak position of highest temperature melting endotherm.

TABLE 2

Solubility of Fractions of SAPECs

| SAPEC | Fraction 1- Wt % soluble at 23° C. | Fraction 2- Wt % soluble at 31° C. | Fraction 3- Wt % soluble at 40° C. | Fraction 4- Wt % soluble at 48° C. |
|---|---|---|---|---|
| SAPEC-3 | 1.0 | 2.9 | 28.3 | 68.5 |
| SAPEC-4 | 6.5 | 95.7 | — | — |
| SAPEC-5 | 51.6 | 52.3 | — | — |
| SAPEC-6 | 18.7 | 83.6 | — | — |
| SAPEC-7 | 36.5 | 64.2 | — | — |
| EPR | 101.7 | — | — | — |

Note:
The sum of the fractions may in some cases add up to slightly greater than 100, due to imperfect drying of the polymer fractions.

TABLE 3

Composition of Fractions of SAPEC's obtained in Table 2

| SAPEC | Wt % ethylene in Fraction 1 | Wt % ethylene in Fraction 2 | Wt % ethylene in Fraction 3 | Wt % ethylene in Fraction 4 |
|---|---|---|---|---|
| SAPEC-3 | | | 8.0 | 7.6 |
| SAPEC-4 | 12.0 | 11.2 | — | — |
| SAPEC-5 | 16.8 | 16.5 | — | — |
| SAPEC-6 | 13.2 | 11.2 | — | — |
| SAPEC-7 | 14.9 | 14.6 | — | — |
| EPR | 46.8 | | | |

Note:
Only fractions with more than 4% of the total mass of the polymer in Table 2 were analyzed for composition. The experimental accuracy in determination of the ethylene content is believed to be within about 0.4% absolute.

The semi-amorphous propylene-ethylene copolymer, SAPEC-1, described in Table 1 was combined with a metallocene-based propylene homopolymer to produce different blend compositions, as will be described later. SAPEC-1 was first visbroken to reach an MFR in the range 25 to 30 dg/min, prior to melt-blending with polypropylene. Visbreaking is a widely used and well-accepted procedure to increase the melt flow rate of propylene polymers. The procedure typically involves melt compounding the propylene polymer in the presence of a specific amount of a peroxide [e.g. (2,5 dimethyl-2,5-di(t-butyl peroxy)hexane) available as Luperox 101 from AtoFina, Organic Peroxides Divn., Philadelphia, Pa.]. The amount is dependent on the degree of MFR increase desired. The visbreaking was done in the presence of polypropylene (60/40 blend of the SAPEC and a metallocene-based propylene homopolymer described in Example 2 below) to provide additional crystallinity. The presence of the polypropylene aids in the extrusion compounding step by providing rapid solidification of the extruded strands in the water bath, easier chopping of the strands into pellets and free movement of the pellets through transfer lines.

Example 2

Visbreaking of Crystallizable Propylene-Ethylene Copolymer (SAPEC-1)

The polymer used along with the semi-amorphous propylene-ethylene copolymer (SAPEC-1) during visbreaking was a propylene homopolymer, having an MFR of ~12 dg/min and an Mw of 183,000 (Mw/Mn=2.1) produced using a metallocene catalyst, namely, rac di-methyl siladiyl bis-(2-methyl, 4-phenyl indenyl)zirconium dimethyl activated with a silica bound activator of N,N-di-ethyl aniline tris(perfluorophenyl)boron. The polymerization was carried out on a 110 kT/annum line. This commercial line comprised a two-reactor, continuous, stirred-tank, bulk liquid-phase process. In the catalyst, the zirconium loading was about 0.11 wt % and the boron loading about 0.12 wt %. The reactors were equipped with jackets for removing the heat of polymerization. The reactor temperature was set at 74° C. (165° F.) in the lead reactor and 68° C. (155 F) in the tail reactor. Catalyst was fed at a rate of about 1.7 lb/hr (0.77 kg/hr). Tri-ethyl aluminum (TEAL; fed to the reactor as a 15 wt % solution in hexane solvent) was used as scavenger at a level of about 20 ppm, based on total propylene feed to both reactors. The catalyst and silica bound activator, described above, were fed as a 10% slurry in mineral oil and were flushed into the reactor with propylene. Propylene monomer was fed into the lead reactor at a rate of 30,000 lb/hr (13620 kg/hr) and to the tail reactor at a rate of 14,000 lb/hr (6356 kg/hr). Hydrogen was added to the reactors for molecular weight control at about 0.18 mole %. Slurry concentration in the reactors was about 48%. Total residence time in the reactors was about 5.5 hours. Polymer production rates were about 15,200 lb/hr (6900 kg/hr) in the lead reactor and 7000 lb/hr (3178 kg/hr) in the tail reactor. The reactor product was routed through a granules-handling system to separate and recover the final polymer product. Catalyst activity during the run was determined to be 11,000 lb/lb. The polymer discharged from the reactors had an MFR of about 12 dg/min (GPC Mw 183,000, Mw/Mn 2.1, Mz/Mw 1.7). 69% of the final polymer product was derived from the first stage and 31% of the final product was derived from the second stage. The polymer was melt homogenized with 900 ppm of Irganox-1076 stabilizer (Ciba-Geigy Corporation) and 250 ppm of calcium stearate neutralizer and pelletized. Visbreaking was conducted on blends of SAPEC-1 with the 12 MFR propylene homopolymer discussed above. The blend ratio was 60 wt % SAPEC-1 and 40 wt % propylene homopolymer. The visbreaking was carried out on a Reifenhauser extruder equipped with a single screw (60 mm screw diameter; 24:1 L/D ratio; mixing screw). 450 ppm of Luperox 101 peroxide was added. The melt temperature was 429° F. (220° C.). The MFR of the visbroken blend product (labeled as Example 2-1) was 29.5 dg/min.

Example 3

Preparation of Blends of Semi-amorphous Propylene-Ethylene Copolymer and Propylene Homopolymer The above visbroken blend product, Example 2-1, was melt-mixed with another metallocene-based propylene homopolymer having an MFR of 24 dg/min (ASTM 1238, 2.16 kg, 230° C.), a density of 0.9 g/cc (ASTM D 792), and an Mw/Mn of 2, available from ExxonMobil Chemical Company in Houston, Tex. under the tradename ACHIEVE™ 3854 to produce several blends, shown in Table 4. The blends comprised 10, 25, 33.3 and 40 wt % of visbroken SAPEC-1 copolymer, the remaining components being the propylene homopolymer used during the visbreaking and ACHIEVE 3854. 1000 ppm of Irganox 2215 stabilizer (Ciba-Geigy Corporation) was used during the melt homogenization of the blends. Characterization data on these blends are shown in Table 5. The molecular weight values show the blends to have narrow molecular weight distributions. This is not surprising since both components are derived from metallocene-based catalysts and have similar MFR values. The DSC data show a reduction in overall crystallinity with increasing levels of crystallizable propylene-ethylene copolymer in the blend. The DSC data also reflect the presence of clarifier (nucleating agent) in some of the blends.

The blend Examples 4-1 to 4-5 are all derived from Semi-Amorphous propylene-ethylene copolymer SAPEC-1, containing 10.7 wt % ethylene. Blend Examples 4-1 to 4-5 are fully miscible systems. This miscibility leads to homogeneous, single-phase blend systems. A representation of this is shown in FIG. 1, which is a plot of tan δ (E"/E' from DMTA measurements) versus temperature for three of the blend compositions (10, 25 and 40 wt % semi-amorphous propylene-ethylene copolymer). FIG. 1 shows the tan δ response in the region of the β relaxation (ie. Tg). Only a single peak is observed for all three compositions, corresponding to the Tg of each homogeneous blend. With increasing amounts of crystallizable propylene-ethylene copolymer, a lowering in peak temperature is noted. The peak temperatures fall between the respective Tg's for neat polypropylene (~0° C.) and the neat semi-amorphous propylene-ethylene copolymer (~−25° C.). The homogeneous morphology can be directly observed from the Atomic Force Microscopy (AFM) micrograph shown in FIG. 2. The micrograph is for the blend containing 40% semi-amorphous propylene ethylene-copolymer. The figure shows the morphology of a cross-section through an injection molded ASTM bar.

Example 4

Fabrication of Molded Parts from Blend Examples 4-2 to 4-5

Blend Examples 4-2 to 4-5 were injection molded to produce test specimens. For standard ASTM test data, a mold that produces a family of ASTM test specimens (e.g. dumbbell bars for tensile testing, circular disks for Gardner impact testing, etc.) was used. Other molds used produced haze chips (1 mm thickness) for haze measurements and 4 inch (101.6 mm) circular disks for instrumented impact testing (SFS Dynatup 8250, General Research Corpn., Santa Barbara, Calif.). The molding was done on a 120 Ton Van Dorn injec-

TABLE 4

Description of Final Blends of Ex 2-1 and Achieve 3854

| Example | SAPEC-1 (wt %) | 12 MFR mPP (wt %) | Achieve 3854 (wt %) | MFR dg/min of blend | Ethylene in blend (wt %) | Millad 3988 (ppm) |
|---------|----------------|-------------------|---------------------|---------------------|--------------------------|--------------------|
| 4-1 | 33.3 | 22.2 | 44.5 | 25.7 | 3.6 | 0 |
| 4-2 | 10 | 6.7 | 83.3 | 22.3 | 1.1 | 2500 |
| 4-3 | 25 | 16.7 | 58.3 | 24.5 | 2.7 | 2500 |
| 4-4 | 25 | 16.7 | 58.3 | 24.8 | 2.7 | 0 |
| 4-5 | 40 | 26.7 | 33.3 | 26.7 | 4.3 | 2500 |

Note:
12 MFR mPP refers to the metallocene homopolymer used during the visbreaking operation. Achieve 3854 contains 250 ppm Irganox 1076 and 750 ppm calcium stearate.

TABLE 5

Characterization of Final Blends of Ex 2-1 and Achieve 3854

| Example | Mn | Mw | Mz | Tm (DSC) (° C.) | ΔH Melt (J/g) | Tc (DSC) (° C.) | ΔH Cryst (J/g) |
|---------|------|------|------|-----------------|---------------|-----------------|----------------|
| 4-1 | 85376 | 150034 | 220466 | 149.1 | 69.4 | 111.4 | 66.3 |
| 4-2 | 90414 | 758775 | 233655 | 152.1 | 88.0 | 123.4 | 87.3 |
| 4-3 | 80343 | 149602 | 224691 | 151.9 | 74.0 | 123.1 | 73.0 |
| 4-4 | 78492 | 147170 | 219191 | 149.0 | 81.2 | 109.9 | 72.5 |
| 4-5 | 80894 | 147386 | 220539 | 152.6 | 60.7 | 124.4 | 63.1 |
| Achieve 3854 | 71202 | 146044 | 229953 | 149.6 | 98.3 | 106.7 | 87.8 |

Molecular weights via high temperature GPC, DSC at 10 C./min heating and cooling rates tion press (HT series, toggle clamp injection molding machine) using ASTM molding conditions for polypropylene (D4101-01a).

Example 5

Molded Part Properties

The following test procedures were used to measure molded part properties.
Haze (both total and internal haze) according to ASTM D-1003
Gloss according to ASTM D-2457 at a 45 degree angle
Yield tensile strength according to ASTM D-638
Yield strain or elongation according to ASTM D-638
Ultimate tensile Strength according to ASTM D-638
Ultimate strain or elongation according to ASTM D-638
Young's modulus according to ASTM D-638
1% secant flexural modulus according to ASTM D-790A
Heat distortion temperature measured at 1.8 MPa (264 psi) according to ASTM D-648
Gardner impact strength (at different temperatures) according to ASTM D-5420
Notched Izod impact strength (at different temperatures) according to ASTM D-256
Instrumented impact strength (at different temperatures) according to ASTM D-3763

Molded part properties, for blend Examples 4-2 to 4-5, are shown in Table 6. Comparable measured properties for conventional Ziegler-Natta random copolymers, of similar overall ethylene comonomer content, are shown in Table 7. The random copolymers selected as comparators were PP9505 E1 (30 MFR, 3 wt % ethylene) and PP9074 Med (24 MFR, 2.8 wt % ethylene). Both these random copolymers are commercial products from Exxon Mobil Chemical Company, Houston, Tex. and are broadly used for molded part applications.

TABLE 6

Injection Molded Part Properties for Blend Examples 4-1 to 4-5

| | Example | | | |
|---|---|---|---|---|
| | Ex 4-2 | Ex 4-3 | Ex 4-4 | Ex 4-5 |
| Visbroken CPEC-1, wt % | 10 | 25 | 25 | 40 |
| Total $C_2$ amount, wt % | 1.1 | 2.7 | 2.7 | 4.3 |
| Clarifier additive, ppm | 2500 | 2500 | 0 | 2500 |
| MFR, dg/min | 22.3 | 24.5 | 24.8 | 26.7 |
| Yield Tensile, psi (MPa) | 4832 (33.3) | 3702 (25.5) | 3264 (22.5) | 2806 (19.4) |
| Yield Strain, % | 9.7 | 13.6 | 15.3 | 16.3 |
| Ultimate Tensile, psi (MPa) | 2736 (18.9) (2/5 no brk) | No brk | 2177 (15.0) (3/5 no brk) | No brk |
| Ultimate Elong, % | 747 | No brk | 848 | No brk |
| 1% Sec Flex Mod, kpsi (MPa) | 203.3 (1403) | 131.2 (905.5) | 101.3 (698.7) | 84.9 (585.9) |
| Rockwell Hard, HRR scale | 98.8 | 84.7 | 80.1 | 62.9 |
| Heat Distortion Temp, C. (at 264 psi or 1.8 MPa) | 54.8 | 48.5 | 44.1 | 42.1 |
| Gardner Impact, in · lb (J) | | | | |
| At 23 C. | 92 (10.4) | 232 (26.2) | 231 (26.1) | 224 (25.3) |
| Failure mode | 12S | 2DB, 11D | 1DB, 12D | 13D |
| At 0 C. | <10 (<1.1) | 67 (7.6) | 216 (24.4) | 241 (27.2) |
| Failure mode | 12S | 12S | 6S, 7DB | 3S, 2DB, 8D |
| Izod Impact, ft · lb/in (J/m) | | | | |
| At 23 C., notched | 0.93 (49.5) | 1.57 (83.8) | 1.15 (61.5) | No brk |
| Failure mode | complete brk | complete brk | complete brk | No brk |
| At 0 C., notched | 0.35 (18.8) | 0.68 (36.2) | 0.53 (28.4) | 1.38 (73.8) |
| Failure mode | complete brk | complete brk | complete brk | complete brk |
| At −18 C., notched | 0.40 (21.5) | 0.38 (20.1) | 0.36 (19.3) | 0.36 (19.2) |
| Failure mode | complete brk | complete brk | complete brk | complete brk |
| Instrument Impact, ft · lb (J) | | | | |
| At 23 C. (25 lb, 15 mph) | 8.5 (11.5) | 28.4 (38.6) | 28.1 (38.1) | 27.0 (36.6) |
| Failure mode | 5B | 5D | 5D | 5D |
| At 0 C. (25 lb, 15 mph) | 2.2 (3.0) | 3.1 (4.2) | 33.5 (45.4) | 30.2 (40.9) |
| Failure mode | 5B | 5B | 5D | 5D |
| Total/Internal haze, % (1 mm thick molded chip) | 10/9.9 | 6.5/5.7 | 60.6/60.2 | 5.3/4.7 |

Notes:
S = Brittle shatter,
B = Brittle,
BD = Brittle-ductile,
DB = Ductile-brittle,
D = Ductile, (in order of increasing ductility),
brk = break.

TABLE 7

Injection Molded Part Properties for Comparative Copolymers
(Commercial Random Copolymers PD9505 E1 and PP9074 Med)

|  | Comparative Example | Comparative Example |
|---|---|---|
|  | PP9505 E1 | PD 9074 Med |
| Total $C_2$ amount, wt % | 3.0 | 2.8 |
| Clarifier additive, ppm | 2500 | 2500 |
| MFR, dg/min | 30 | 24 |
| Yield Tensile, psi (MPa) | 4514 (31.1) | 4285 (29.6) |
| Yield Strain, % | 9.8 | 13.1 |
| Ultimate Tensile, psi (MPa) | 2999 (20.7) | 2742 (18.9) |
|  | (3/5 no brk) | (3/5 no break) |
| Ultimate Elong, % | 899 | 996 |
| 1% Sec Flex Mod, kpsi (MPa) | 187.6 (1294.3) | 158.2 (1091.6) |
| Rockwell Hard, HRR scale | 95.8 | 92.5 |
| Heat Distortion Temp, C. | 53.6 | 49.6 |
| (at 264 psi or 1.8 MPa) |  |  |
| Gardner Impact, in · lb (J) |  |  |
| At 23 C. | 73.9 (8.3) | 175.5 (19.8) |
| Failure mode | 11S | 4S, 2DB, 7D |
| At 0 C. | <10 (<1.1) | 17.3 (2.0) |
| Failure mode | 12S | 13S |
| Izod Impact, ft · lb/in (J/m) |  |  |
| At 23 C., notched | 0.76 (40.3) | 1.04(55.4) |
| Failure mode | complete brk | complete brk |
| At 0 C., notched | 0.52 (28.0) | 0.43 (23.2) |
| Failure mode | complete brk | complete brk |
| Instrument Impact, ft · lb (J) |  |  |
| At 23 C. (25 lb, 15 mph) | 8.0 (10.8) | 28.9 (39.2) |
| Failure mode | 5B | 5D |
| At 0 C. (25 lb, 15 mph) | — | 1.4 (1.9) |
| Failure mode | 5B | 5B |
| Total/Internal haze, % | 6.3/6.0 | 9.1/8.4 |
| (1 mm thick molded chip) |  |  |

Notes:
S = Brittle shatter,
B = Brittle,
BD = Brittle-ductile,
DB = Ductile-brittle,
D = Ductile (in order of increasing ductility)

A comparison of the data for Example 4-3 (2.7 wt % ethylene), Example 4-5 (4.3 wt % ethylene) and random copolymer PP9505 E1 (3.0 wt % ethylene), all clarified products, is shown in FIG. 3.

FIG. 3 compares eight molded-part properties. [Ex 4-3 (triangles), Ex 4-5 (diamonds) and PP9505 E1 RCP (squares)]. Starting from the top and moving clockwise, the following observations are made for Examples 4-3 and 4-5 versus random copolymer comparator PP9505 E1:

i. Improved tensile behavior for the blend Examples; no breaks (0/5) following Instron extension to 1000% versus partial breaks (2/5) for the RCP comparator
ii. Softer, lower modulus molded articles
iii. Improved Gardner impact resistance at 23 C (232 in.lb with 11/13 ductile failures for Example 4-3, 224 in.lb with 13/13 ductile failures for Ex 4-3 versus 73.9 in.lb with 11/11 brittle shatter failures for PP9505 E1)
iv. Improved Gardner impact resistance at 0 C (67.3 in.lb with 12/12 brittle shatter failures for Example 4-3, 240.7 in.lb with 8/12 ductile failures for Example 4-5 versus <10 in.lb with 13/13 brittle shatter failures for PP9505 E1
v. Lower heat distortion resistance (at 264 psi) for the blend Examples (48.5 C and 42.1 C for Examples 4-3 and 4-5 respectively, versus 53.6 C for PP9505 E1)
vi. Improved notched Izod resistance at both 23 C and 0 C for the blend & Examples. At 23 C, 1.57 ft.lb/in with complete breaks for Ex 4-3; no
vii. breaks for Example 4-5; 0.76 ft.lb/in with complete breaks for PP9505 E1
viii. Equivalent or lower haze (better clarity) for blend Examples 4-3 and 4-5 versus PP9505 E1

Aside from the heat distortion resistance, both of the blend Examples show property improvements over the random copolymer comparator. Note that Example 4-3 with 25 wt % of the semi-amorphous propylene-ethylene copolymer (2.7 wt % total ethylene) showed improved toughness, improved softness and comparable clarity to RCP control PP9505 E1 (3.0 wt % ethylene). The desired properties of toughness (down to 0 C), clarity and softness (low modulus) get even more favorable at blend levels of 30 and 40 wt %. As demonstrated by blend Example 4-5, molded articles with outstanding toughness (ductile down to 0 C), softness ($\leqq 100$ kpsi (690 MPa) flex modulus) and clarity (<9% haze measured on a 1 mm haze chip) are obtained from the 40 wt % semi-amorphous propylene-ethylene copolymer blends. A similarly favorable matchup is obtained when the properties of Example 4-3 (25 wt % semi-amorphous propylene-ethylene copolymer; 2.7 wt % total ethylene) and 4-5 (40 wt % semi-amorphous propylene-ethylene copolymer; 4.3 wt % total ethylene) are compared against those of commercial random copolymer PP9074 Med. Example 4-3, at similar ethylene content, has better tensile properties, is softer, has slightly better toughness both at 23 C and 0 C, and has lower haze. Example 4-5, at 40 wt % semi-amorphous propylene-ethylene copolymer (4.3 wt % total ethylene) is again far superior in the key properties of softness, toughness down to 0 C and low haze.

Example 6

Fabrication of Fibers and Spunbond Fabric from Blend Example 4-1

Blend Example 4-1 was first run on a fiber line to produce partially oriented yarn, to evaluate its fiber-forming capability. Polypropylene ACHIEVE 3854 was used as control (also referred to in tables and figures as 3854). Fibers were prepared as spun, flat (non-lustre or low-lustre) partially oriented yarns by mechanical take-up of the fiber bundle from its extruded melt. A description of the line used can be found in U.S. Pat. No. 5,723,217, incorporated herein by reference. Blend Example 4-1 processed well. The line speed before yarn breakage (ie. speed-to-break) was upwards of 4000 m/min, comparable to that for the control. The fiber trial provided evidence for good spinnability and fiber formation for the blend product.

A spunbond fabric trial was conducted on a Reicofil line made by the Reifenhauser Company, Germany. The extruder size was 70 mm with a 30:1 length: diameter ratio. The spinneret had 4036 die plate holes, each with a diameter of 0.6 mm. Continuous fibers were extruded, laid on an endless belt and then bonded to each other using heated calender rolls, one plain and the other bearing a pattern of raised points. The actual bonded area represented about 14.5% of the total web surface area. More details on the spunbond process can be obtained from Wadsworth, L. C. and Goswami, B. C., Nonwoven Fabrics: "Spunbonded and Melt Blown Processes", Proceedings of the Eighth Annual Nonwovens Workshop, Jul. 30 to Aug. 3, 1990, sponsored by TANDEC, University of Tennessee at Knoxville. Fabrics were produced from Example 4-1 and ACHIEVE 3854 control. Three fabric bond temperatures (low, medium and high) were studied for blend Example 4-1. At each bond temperature, fabrics with basis weights of 17, 35 and 70 g/sq meter (gsm) were collected. The throughput was set at 0.3 g/hole/minute (ghm). To evaluate the influence of slip agent on the feel of the fabric, an oleamide masterbatch (6 wt % oleamide in a blend of semi-amorphous propylene-ethylene copolymer with 3854; 5 wt % let down to deliver 3000 ppm oleamide to the fabric) was used at the line.

The blend Example 4-1 processed well on the Reicofil line. Example 4-1 followed ACHIEVE 3854 and no alterations were made to the extruder temperature profile to account for the presence of the 33.3 wt % of semi-amorphous propylene-ethylene copolymer present in the blend. Accordingly, an adjustment of the line conditions used for ACHIEVE 3854 was required to run the blend. In particular, the cooling air temperature and the cooling and suction blower speeds were reduced (see Table 8). Once out of the transition from 3854, stable operation was regained. The fiber diameter from the fabrics was slightly larger than those from the ACHIEVE control (by about 1 μm). Operators of ordinary skill in the art will recognize that this reflects a reduced level of orientation, a result of the reduction in blower speeds (draw force). A preferred run procedure for these inventive blends would be to lower the melt temperature by reducing the extrusion temperature profile. This will avoid having to manipulate (lower) the blower speeds, thereby allowing the implementation of maximum draw force acting on the fibers, to produce fine, highly oriented fibers. The fabric appearance as judged by fabric 'formation' (uniformity of distribution of fibers in the fabric) was observed to be satisfactory for all the blend fabrics.

Example 7

Spunbond Fabric Properties of Example 4-1

Figure 4:
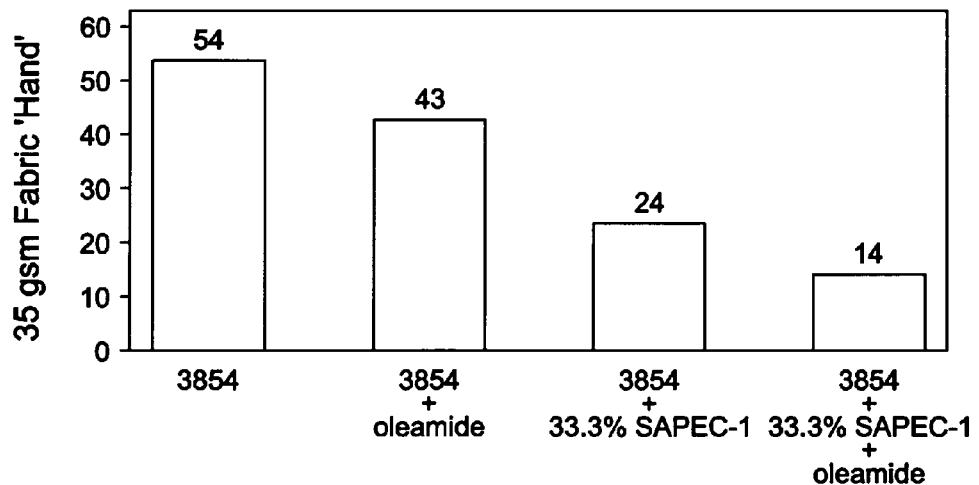
FIG. 4 is a comparison of nonwoven fabric Hand for fabrics made from inventive blend Example 4-1 versus metallocene propylene homopolymer control ACHIEVE 3854.
Figure 5:
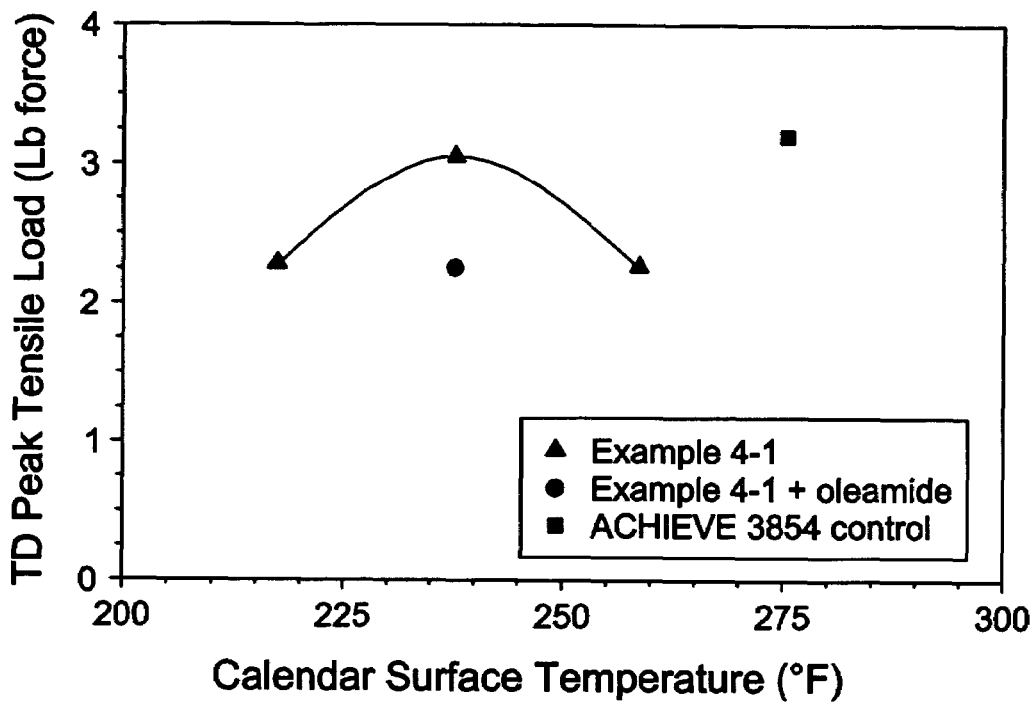
FIG. 5 is a plot of the bonding curve for 17 g/sq.m fabric made from the inventive blend Example 4-1, compared against metallocene propylene homopolymer control ACHIEVE 3854.

The fabrics were tested for 'hand' using a Handle-O-Meter instrument, described earlier. The 'hand' value (in grams) is a measure of the feel of the fabric. A propylene polymer fabric having the characteristic of softness will show a lower value of 'hand' when compared against fabric from homopolymer polypropylene (e.g. ACHIEVE 3854). A softer fabric generally shows better drapeability (ie. form-fitting coverage over an object) and has a more cloth-like feel. Fabric tensile properties, including Peak Force and Peak Elongation in the machine direction (MD) and transverse or cross direction (TD) and properties based on fabric tensile properties, like Optimum bonding temperature, were measured with reference to ASTM standard D 1682-64, as described earlier. Machine direction tear strength was measured with reference to ASTM standards D-1922 and 5734. The Handle-O-Meter results for 35, 70 and 17 gsm fabrics are shown in Table 9. 35 gsm data are plotted in FIG. 4. Fabric tensile properties are shown in Table 10. Bonding curves, for 17 gsm fabrics, are shown in FIG. 5. Finally, fabric tear data (MD tear) on 35 gsm fabrics are presented in Table 11.

TABLE 9

Handle-O-Meter Results on Fabrics from ACHIEVE 3854 and Ex 4-1

|  | Oleamide | Bonding T(F.)/(C.) | 'Hand' (g force) |
|---|---|---|---|
| i. 35 gsm Fabrics (10 mm slot width) | | | |
| ACHIEVE 3854 | None | 281.5/138.6 | 53.8 |
|  | 3000 ppm | 281.5/138.6 | 42.6 |
| Example 4-1 | None | 217.5/103.1 | 23.8 |
| [33.3% from SAPEC-1 | None | 238/114.4 | 23.7 |
| 10.7% C$_2$ in SAPEC-1] | 3000 ppm | 238/114.4 | 14.2 |
|  | None | 258.5/125.8 | 27.7 |
| ii. 70 gsm Fabrics (20 mm slot width) | | | |
| ACHIEVE 3854 | None | 281.5/138.6 | 97.6 |
|  | 3000 ppm | 281.5/138.6 | 76.4 |
| Example 4-1 | None | 217.5/103.1 | 41.4 |
| [33.3% from SAPEC-1 | None | 238/114.4 | 40.0 |
| 10.7% C$_2$ in SAPEC-1] | 3000 ppm | 238/114.4 | 27.6 |
|  | None | 258.5/125.8 | 47.1 |
| ii. 17 gsm Fabrics (6.35 mm slot width) | | | |
| ACHIEVE 3854 | None | 279.5/137.5 | 24.3 |
| Example 4-1 | None | 217.5/103.1 | 15.7 |
| [33.3% from SAPEC-1 | None | 238/114.4 | 17.0 |
| 10.7% C$_2$ in SAPEC-1] | 3000 ppm | 238/114.4 | 11.1 |
|  | None | 258.5/125.8 | 15.0 |

TABLE 10

Fabric Tensile Properties (ACHIEVE 3854 and Ex 4-1)

|  |  | Machine Direction | | Transv Direction | |
|---|---|---|---|---|---|
|  | Bonding T (° F.) | Peak Force (g) | Elong (%) | Peak Force (g) | Elong (%) |
| i. 35 gsm Fabrics | | | | | |
| 3854 | 281.5 | 16.84 | 62.32 | 8.18 | 64.49 |
| 3854 + slip | 281.5 | 15.45 | 57.96 | 7.73 | 65.61 |
| Example 4-1 | 217.5 | 6.9 | 41.51 | 4.26 | 50.99 |
| Ex 4-1 | 238 | 9.96 | 63.23 | 6.64 | 69.30 |
| Ex 4-1 + slip | 238 | 7.10 | 65.00 | 5.12 | 80.67 |
| Ex 4-1 | 258.5 | 10.66 | 63.71 | 8.07 | 79.77 |
| ii. 70 gsm Fabrics | | | | | |
| 3854 | 281.5 | 17.11 | 31.56 | 10.16 | 58.32 |
| 3854 + slip | 281.5 | 14.66 | 26.01 | 7.62 | 46.43 |
| Example 4-1 | 217.5 | 6.77 | 20.48 | 5.48 | 42.15 |
| Ex 4-1 | 238 | 10.46 | 29.98 | 7.89 | 46.76 |
| Ex 4-1 + slip | 238 | 7.96 | 34.52 | 5.57 | 49.94 |
| Ex 4-1 | 258.5 | 20.14 | 62.12 | 15.00 | 78.48 |
| iii. 17 gsm Fabrics | | | | | |
| 3854 | 281.5 | 7.91 | 52.00 | 3.37 | 53.00 |
| Example 4-1 | 217.5 | 3.46 | 48.00 | 2.31 | 55.00 |
| Ex 4-1 | 238 | 4.44 | 54.00 | 3.08 | 62.00 |
| Ex 4-1 + slip | 238 | 3.52 | 51.00 | 2.27 | 59.00 |
| Ex 4-1 | 258.5 | 3.41 | 36.00 | 2.29 | 43.00 |

TABLE 11

MD Tear Strength on 35 gsm Fabrics (ACHIEVE 3854 and Ex 4-1)

|  | SAPEC-1 Content (wt %) | Bonding T (F.) | MD Tear Strength (g) |
|---|---|---|---|
| 3854 | 0 | 281.5 | 643.0 |
| 3854 + slip | 0 | 281.5 | 775.4 |
| Example 4-1 | 33.3 | 217.5 | 1422.8 |
| Ex 4-1 | 33.3 | 238 | 1038.0 |
| Ex 4-1 + slip | 33.3 | 238 | 996.1 |
| Ex 4-1 | 33.3 | 258.5 | 629.6 |

Reviewing the data in the tables and figures, the addition of the semi-amorphous propylene-ethylene copolymer (SAPEC-1) to polypropylene homopolymer ACHIEVE 3854 results in a substantial lowering in fabric 'hand'. The homogeneous blend product displays a soft, aesthetically-pleasing feel and better drapeability than the neat polypropylene fabric. A Handle-O-Meter 'hand' value of ≦20 g, preferably ≦15 g, for 35 gsm fabrics, is desired by the industry. These targets can be readily attained by a homogeneous blend of semi-amorphous propylene-ethylene copolymer and propylene homopolymer in the right ratio. The softness and fabric feel can be further enhanced via the incorporation of low levels of slip agent (e.g. oleamide additive) into the blend compositions, an approach utilized in the industry. FIG. 4 shows the Fabric 'Hand' of 35 gsm Spunbond Fabrics from Ex 4-1 and 3854 both with and without the addition of slip agent.

Together with the enhanced softness and good fabric feel, the homogeneous blend product showed good processability on spunbond fabricating equipment. A competitive output rate was achieved and maintained together with good fabric 'formation' (ie. uniform distribution of fibers, providing even coverage across the fabric). Achieving commercial output rates while maintaining good fabric 'formation' has been a problem when standard, Ziegler-Natta propylene random copolymers have been used to obtain soft fabrics. A random copolymer of 4 wt % ethylene (e.g. PP9302, a grade from ExxonMobil Chemical Company, visbroken to 35 MFR), slightly higher than the 3.6 wt % total ethylene of Example 4-1, has been demonstrated to provide spunbond fabric with similar 'hand' (softness) to that of Example 4-1. However, it provides poor 'formation', leading to unacceptable fabric.

The blend fabric offers an opportunity to lower the optimum bonding temperature. FIG. 5 shows the bonding curve for 17 gsm fabric. For homopolymer ACHIEVE 3854, the optimum bonding temperature for 17 gsm fabric is ~275° F. (135° C.). Example 4-1, with 33.3% of the semi-amorphous propylene-ethylene copolymer, SAPEC-1, shows an optimum bonding temperature of about 238° F. (114° C.), about 20 C lower than the homopolypropylene control. The use of lower bonding temperatures is desired in the industry to minimize any chance of partial melting, which can weaken the strength and integrity of the fabric. The fabric tensile properties (peak force and elongation) of the 17 gsm fabric from Example 4-1 are seen to be quite satisfactory, particularly in the TD direction, which is generally the weaker direction for tensile strength. As indicated earlier, the fiber diameters of Example 4-1 fabrics were slightly larger than the 3854 control, suggesting a reduced level of orientation and strength. This can be remedied by adjusting some process fabrication parameters to yield even stronger fibers.

Figure 6:
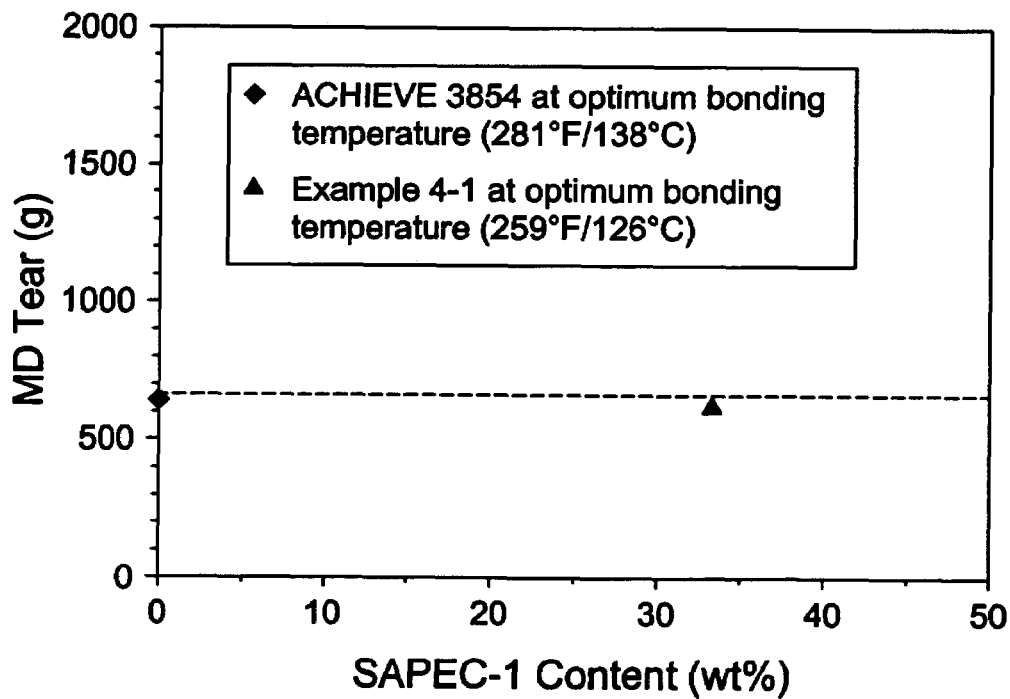

Finally, the tear resistance of the fabric is also seen to be satisfactory. FIG. 6 shows the MD tear strength of 35 gsm fabric from Example 4-1, bonded at a temperature close to its optimum (238 F or 114 C), to be higher than that of the base 3854 fabric at its optimum bonding temperature.

Spunbond fabric from a homogeneous polypropylene-rich blend with a semi-amorphous propylene-ethylene copolymer (SAPEC), has an attractive balance of properties. The blend provides a desirable combination of soft fabric (Handle-O-Meter 'hand' of ≦20 g for 35 gsm fabric), coupled with good spunbond processability (continuous operability at output rates ≧0.3 ghm) and uniform fabric 'formation'. The optimum bonding temperature is lower than that for polypropylene and the fabric tensile and tear properties are satisfactory (at least as good as neat polypropylene). The performance of the blend is superior to that of standard Ziegler-Natta random copolymers of equivalent total ethylene content. With these RCPs, an ethylene level of ~4 wt % is needed to obtain the desired softness, however, the processability of these RCPs is poor and the fabric 'formation' is unacceptable.

Example 8

Fabrication of Film from Example 4-1 and Controls

The polymers evaluated as cast monolayer films are listed in Table 12.

TABLE 12

Description of Polymers Used to Fabricate Films

| | Polymer type | MFR (dg/min) | Total Ethylene (wt %) |
|---|---|---|---|
| Example 4-1 | HPP/SAPEC blend (homogeneous) | 25.7 | 3.6 |
| ACHIEVE 3854 | Metallocene HPP | 24 | 0 |
| Example 8-1 | Metallocene RCP | 24.0 | 3.2 |
| Example 8-2 | Z-N RCP | 24.0 | 3.0 |
| Example 8-3 | Z-N RCP | 5.0 | 5.0 |

Notes:
i. HPP is homopolymer; SAPEC is the semi-amorphous propylene-ethylene copolymer blend component; RCP is random copolymer Examples 8-1, 8-2 and 8-3 were used as controls, along with ACHIEVE 3854. Example 8-1, a metallocene-based RCP, was obtained via polymerization in a pilot scale, two-reactor, continuous stirred tank, bulk liquid-phase process. The same catalyst system as described in Example 2 above, was used. The reactors were equipped with jackets for removing the heat of polymerization. Key run conditions are described below:

The reactor temperature was set at 64° C. (148° F.) in the lead reactor and 59° C. (138° F.) in the tail reactor;

Catalyst was fed at a rate of 1.7 g/hr; the catalyst was fed as a 10% slurry in mineral oil and flushed into the reactor with propylene;

Tri-ethyl aluminum (TEAL; fed to the reactor as a 1 wt % solution in hexane solvent) was used as scavenger at a level of 20 ppm;

Propylene monomer was fed to the lead reactor at a rate of 79.5 kg/hr (175 lb/hr) and to the tail reactor at a rate of 30 kg/hr (65 lb/hr);

Ethylene was fed to both reactors, the vapor phase concentration of ethylene in both reactors was ~10 mole %;

Hydrogen was added for molecular weight control at 1129 mppm in the lead reactor and 1641 mppm in the tail reactor; and Polymer production rates were 18.0 kg/hr (39.5 lb/hr) in the lead reactor and 6.4 kg/hr (14.1 lb/hr) in the tail reactor. The reactor product was routed through a granules-handling system to separate and recover the final polymer. The polymer discharged from the reactors had an MFR of 6.4 dg/min (GPC Mw 223,660, Mw/Mn 2.0, Mz/Mw 1.68). The ethylene incorporation was measured as 3.3 wt % in the lead reactor product and 3.1 wt % in the tail reactor product. Ethylene measured in the final blended product was 3.2 wt %. 74% of the final polymer product was derived from the first stage and 26% of the final product was derived from the second stage. The polymer showed a DSC melting peak at 127.8 C and a DSC crystallization peak at 91.23° C. The polymer was melt homogenized with 500 ppm of Irganox-2215 (Ciba-Geigy Corporation) and 300 ppm of DHT-4A neutralizer (Kyowa Chemical Industry Co. Ltd., Osaka, Japan) and vis-broken to a final MFR of 24, from the starting MFR of 6.4. The final visbroken product at 24 MFR was used as a control during film fabrication and film testing and labeled as Example 8-1.

Example 8-2, a Ziegler-Natta-based RCP, was obtained as follows. Granules of random copolymer (from a standard commercial Ziegler-Natta catalyst; 2nd generation, unsupported catalyst; a description of 2nd generation Z-N catalysts for polypropylene can be found in the "Polypropylene Handbook", edited by E. P. Moore, Jr., Hanser, 1996) produced in a commercial reactor, were used as the starting material. The product contained 3.0 wt % ethylene as comonomer. This granular product is the precursor to several commercial RCP grades, such as PD 9355 (35 MFR), produced by ExxonMobil Chemical Company, Houston, Tex. These granules were melt homogenized with 500 ppm of Irganox-2215 (Ciba-Geigy Corporation) stabilizer and 300 ppm of DHT-4A neutralizer (Kyowa Chemical Industry Co. Ltd., Osaka, Japan) and vis-broken from an MFR ~1.0 to 24 MFR. This 24 MFR, 3.0 wt % ethylene copolymer, labeled as Example 8-2, served as one Ziegler-Natta RCP control.

The other Ziegler-Natta random copolymer control was PD9282 E2, from ExxonMobil Chemical Company, Houston, Tex. This commercial product is made from a standard, supported Ziegler-Natta catalyst. It is a 5.0 MFR copolymer and contains 5.0 wt % ethylene. It has a DSC melting point of 133 C and is targeted for use as as a seal layer film. It contains an additive package of 1800 ppm Irganox-1010 stabilizer (Ciba-Geigy Corporation), 300 ppm DHT-4A neutralizer and 1000 ppm antiblock. PD9282 E2 was labeled as Example 8-3.

Cast monolayer films from most of the polymers in Table 12 were fabricated on a Killion cast coex film line. The line has three 24:1 L/D extruders ('A' extruder at 1 inch or 25.4 mm diameter; 'B' extruder at 0.75 inch or 19.05 mm diameter; 'C' extruder at 0.75 inch or 19.05 mm diameter) which feed polymer into a feedblock.

For the monolayer films, only the 'A' extruder was used. The feedblock diverts molten polymer from each extruder to specific channels. The combined streams enter an 8 inch (203.2 mm) wide Cloeren die. Molten polymer exits the die and is cast onto a chill roll (8 inch or 203.2 mm diameter and 10 inch or 254 mm roll face). The film take-off unit is of adjustable speed, to obtain films of different desired thicknesses. Typical line operating conditions during the production of about 2 mil (50.8 μm) films are shown in Table 13.

TABLE 13

Typical Killion Cast Line Operating Conditions (2 mil or 50.8 μm films)

| | |
|---|---|
| Zone 1 Temperature | 390 F. (199 C.) |
| Zone 2 Temperature | 400 F. (204.5 C.) |
| Zone 3 Temperature | 410 F. (210 C.) |
| Adapter 1 Temperature | 420 F. (215.5 C.) |
| Adapter 2 Temperature | 420 F. (215.5 C.) |
| Die/Feedblock Temperature | 430 F. (221 C.) |
| Melt Temperature | 396-400 F. range (202-204.5 C.) |
| Pressure | 390-420 psi range (2.7 MPa-2.9 MPa) |
| Extruder Speed | 45-58 rpm range |
| Extruder Drive | 2-2.5 amp range |
| Line Speed | 10.8-11.6 fpm range (3.3-3.5 mpm) |
| Chill Roll Temperature | 58-64 F. range (14.5-17.8 C.) |
| Film thickness | 2.0-2.4 mil range (50.8-61.0 μm) |

Example 9

Monolayer Cast Film Properties

Test methods for the different film properties are outlined below. Film properties are generally identified with reference to the film orientation (e.g. along the machine direction, MD; or along the cross or transverse direction, TD). If a film property is mentioned without identifying the related film direction, then i) directionality is not relevant (e.g. puncture resistance) or ii) the value is the average over the machine and transverse directions.

| Test | Test Method |
|---|---|
| MD Ultimate Tensile Strength, kpsi (MPa) | ASTM D 882 |
| TD Ultimate Tensile Strength, kpsi (MPa) | ASTM D 882 |
| MD Elongation at Break, % | ASTM D 882 |
| TD Elongation at Break, % | ASTM D 882 |
| MD Tensile Modulus, kpsi (MPa) | ASTM D 882 |
| TD Tensile Modulus, kpsi (MPa) | ASTM D 882 |
| MD Elmendorf tear, g/mil (g/μm) | ASTM D 1922, |
| TD Elmendorf tear, g/mil (g/μm) | ASTM D 1922, |
| Puncture Resistance, lb/mil (g/μm) | ASTM 5748-95* |
| Puncture Energy, in · lb/mil (J/μm) | ASTM 5748-95* |
| Total energy impact, ft · lb (J) | ASTM D 4272-99 |
| Haze, % | ASTM D 1003 |
| Gloss at 45 degree, unit | ASTM D 2457 |

*Puncture resistance and puncture energy testing followed ASTM D 5748-95, but with the following exceptions:
i.) A 0.75 inch diameter elongated stainless steel probe with matted finish was used, instead of a 0.75 inch diameter pear-shaped TFE-fluorocarbon coated probe.
ii) An average gauge value measured for the test sample was used as the gauge for all puncture measurements on that sample, instead of measuring the gauge of each sample specimen.

Optical properties of 2.0 mil (50.8 μm) cast monolayer films from the polymers and polymer blends in Table 12 are shown in Table 14. All the films display low haze, but the film of inventive Example 4-1 appears to have the best clarity. Likewise, the gloss of this SAPEC-1 based homogeneous blend film appears very favorable.

TABLE 14

Monolayer Cast Film Optical Properties

| | | Film thickness Haze | Gloss at 45° | |
|---|---|---|---|---|
| | Single Polymer or Blend | (mil/μm) | (%) | (unit) |
| Example 4-1 | Homogeneous blend | 2.05/52.1 | 0.4 | 90.8 |
| ACHIEVE 3854 | Single polymer (metallocene HPP) | 2.2/55.6 | 0.9 | 90.8 |
| Example 8-1 | Single polymer (metallocene RCP) | 2.08/52.8 | 1.1 | 89.9 |
| Example 8-2 | Single polymer (Z-N RCP) | 2.3/58.4 | 1.2 | 88.4 |

Film mechanical properties for these same polymers are shown in Table 15.

TABLE 15

Monolayer Cast Film Mechanical Properties

|  | Ex 4-1 (SAPEC blnd) | Ex 8-1 (m RCP) | Ex 8-2 (Z-N RCP) | ACHIEVE 3854 (mHPP) |
|---|---|---|---|---|
| MD Ult Tensile, kpsi (MPa) | 6.3 (43.5) | 6.3 (43.5) | 6.0 (41.4) | 7.7 (53.1) |
| TD Ult Tensile, kpsi (MPa) | 6.4 (44.2) | 6.0 (41.4) | 5.9 (40.7) | 7.2 (49.7) |
| MD Break Elong, % | 695 | 675 | 668 | 698 |
| TD Break Elong, % | 706 | 656 | 672 | 686 |
| MD Ten Mod, kpsi (MPa) | 40 (276) | 60 (414) | 64 (442) | 115 (794) |
| TD Ten Mod, kpsi (MPa) | 39 (269) | 58 (400) | 61 (421) | 106 (731) |
| MD Elmen Tear, g/mil (g/μm) | 57 (2.24) | 33 (1.3) | 29 (1.14) | 35 (1.38) |
| TD Elmen Tear, g/mil (g/μm) | 62 (2.44) | 36 (1.42) | 37 (1.46) | 36 (1.42) |
| Puncture Resist, lb/mil (g/μm) | 8.7 (155.5) | 8.2 (146.6) | 8.7 (155.5) | 8.7 (155.5) |
| Punct Energy, in.lb/mil (J/μm) | 30.3 (0.13) | 24.2 (0.11) | 26.6 (0.12) | 23.1 (0.10) |
| Total Energy Impact, ft.lb (J) | 3.5 (4.75) | 2.4 (3.3) | 2.7 (3.7) | 1.8 (2.44) |

Note:
mRCP is metallocene RCP;
Z-N RCP is Ziegler-Natta RCP;
mHPP is metallocene propylene homopolymer.

The homogeneous SAPEC blend film, Example 4-1, displays a balanced film properties profile. The film is substantially softer than the RCP's of comparable ethylene comonomer level, has better total energy impact and Elmendorf tear resistance and similar tensile strength and elongation.

When compared against an RCP of higher ethylene content (Example 8-3 at 5 MFR, 5 wt % ethylene), the blend film Example 4-1 (3.6 wt % ethylene) retains a favorable properties profile, as seen from the data in Table 16. The film shows better clarity and gloss, comparable toughness and lower modulus (softer film) than the 5 wt % ethylene RCP.

TABLE 16

Monolayer Cast Film Mechanical Properties

|  | Ex 4-1 (3.6 wt % ethylene) | Ex 8-3 (5 wt % ethylene) |
|---|---|---|
| Film thickness, mil (μm) | 2.05 (52.1) | 1.77 (45) |
| MD Ult Tensile, kpsi (MPa) | 6.3 (43.5) | 7.5 (51.8) |
| TD Ult Tensile, kpsi (MPa) | 6.4 (44.2) | 6.4 (44.2) |
| MD Break Elong, % | 695 | 624 |
| TD Break Elong, % | 706 | 643 |
| MD Ten Mod, kpsi (MPa) | 40 (276) | 57 (393) |
| TD Ten Mod, kpsi (MPa) | 39 (269) | 57 (393) |
| MD Elmen Tear, g/mil (g/μm) | 57 (2.24) | 53.3 (2.1) |
| TD Elmen Tear, g/mil (g/μm) | 62 (2.44) | 180 (7.1) |
| Puncture Resist, lb/mil (g/μm) | 8.7 (155.5) | 6.3 (112.6) |
| Punct Energy, in.lb/mil (J/μm) | 30.3 (0.13) | 14.3 (0.06) |
| Total Energy Impact, ft.lb (J) | 3.5 (4.75) | — |
| Haze, % | 0.4 | 3.1 |
| Gloss at 45°, unit | 90.8 | 77.8 |

All patents and patent applications, test procedures (such as ASTM methods), and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

The invention claimed is:

1. A film comprising a homogeneous blend of:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 110 and 170° C., a heat of fusion of at least 80 J/g, and a 1% Secant Flexural Modulus of 100,000 to 250,000 psi, and a melt flow rate of 200 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more comonomers, selected from the group consisting of ethylene, butene, pentene, hexene, heptene, octene, nonene, and decene, said semi-amorphous polymers each having:
  a) 10 to 50 percent crystallinity;
  b) a melt flow rate of 200 dg/min or less;
  c) a DSC melting point (second melt Tm) of 100° C. or less;
  d) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
  e) an Mw/Mn of 1.5 to 4,
  f) a triad tacticity of three propylene units, as measured by $^{13}C$ NMR, of 75% or greater, and
  g) a heat of fusion of between 4 and 70 J/g;
where the blend has:
  i) a melt flow rate of 0.5 to 100 dg/min; and
  ii) less than 5 weight % filler, based upon the weight of the polymers and the filler; and
  iii) a permanent set of greater than 65%; and
where the film has:
  1) a thickness of 2.5 to 635 microns;
  2) a haze of 10% or less, prior to addition of clarifying or nucleating agents;
  3) a 45 degree gloss of 85 or more;
  4) a 1% Secant tensile modulus of 860 to 205 MPa;

5) an Elmendorf tear in the machine direction of 1.57 g/micron or more;
6) an Elmendorf tear in the transverse direction of 1.57 g/micron or more; and
7) a total energy impact at 23° C. of 2.7 J or more.

2. The film of claim 1 wherein the difference in comonomer content is no greater than 10 weight %.

3. The film of claim 1 wherein the intermolecular composition distribution of the semi-amorphous copolymer is 90% or more.

4. The film of claim 1 wherein the film has a machine direction Elmendorf Tear or 2.16 g/micron or greater.

5. The film of claim 1 wherein the film has a Total energy impact of 4 J or greater.

6. The film of claim 1 wherein the film has a Puncture Energy of 0.12 J/micron or greater.

7. The film of claim 1 wherein the film has a 1% Secant tensile modulus of 518 MPa or lower.

8. The film of claim 1 wherein the film has a haze of 5% or less.

9. The film of claim 1 wherein the film has a haze of 3% or less.

10. The film of claim 1 wherein the film has a haze of 2% or less.

11. The film of claim 1 wherein the film has a haze of 1% or less.

12. The film of claim 1 wherein the film has a haze of 0.5% or less.

13. The film of claim 1 wherein the film has a 45 degree gloss of 88 units or greater.

14. The film of claim 1 wherein the film has a 45 degree gloss of 90 units or greater.

15. The film of claim 1 wherein the film has a 1% secant tensile modulus of 690 MPa or less, an MD Elmendorf Tear of 1.77 g/micron or more, a haze or 2% or lower, a 45 degree gloss of 88 units or higher, and a Total energy impact at 23° C. of 4 J or greater.

16. The film of claim 1 wherein the film has a 1% secant tensile modulus of 518 MPa or lower, an MD Elmendorf tear of 2.16 g/microns or greater, a haze of 2% or lower, a 45 degree gloss of 88 units or higher, and a Total energy impact at 23° C. of 4.75 J or greater.

17. The film of claim 1 wherein the blend has a permanent set of 85% or greater.

18. The film of claim 1 wherein the blend has a permanent set of 100% or greater.

19. The film of claim 1 wherein the blend has a permanent set of 150% or greater.

20. A molded article comprising a homogeneous blend of:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 110 and 170° C., a heat of fusion of at least 80 J/g, and a 1% Secant Flexural Modulus of 100,000 to 250,000 psi, and a melt flow rate of 200 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more comonomers, selected from the group consisting of ethylene, butene, pentene, hexene, heptene, octene, nonene, and decene, said semi-amorphous polymers each having:
a) 10 to 50 percent crystallinity;
b) a melt flow rate of 200 dg/min or less;
c) a DSC melting point (second melt Tm) of 100° C. or less;
d) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
e) an Mw/Mn of 1.5 to 4,
f) a triad tacticity of three propylene units, as measured by $^{13}$C NMR, of 75% or greater, and
g) a heat of fusion of between 4 and 70 J/g;
where the blend has:
i) a melt flow rate of 0.5 to 200 dg/min; and
ii) less than 5 weight % filler, based upon the weight of the polymers and the filler; and
iii) a permanent set of greater than 65%; and
iv) a haze of 12% or less measured on a 1 mm thick injection molded chip,
where the molded article has:
1) a thickness of 250 μm to 10 mm;
2) a 1% Secant Flexural Modulus at 23° C. of 1035 MPa or less;
3) a Gardner Impact Strength at 23° C. of 11.3 J or more; and
4) a Gardner Impact Strength at 0° C. of 50 5.6 J or more.

21. The molded article of claim 20 wherein the molded article has a Notched Izod Impact Strength at 23° C. of 53 J/m or more.

22. The molded article of claim 20 wherein the molded article has a Gardner Impact Strength at 23° C. of 22.6 J or more.

23. The molded article of claim 20 wherein the molded article has a Notched Izod Impact Strength at 23° C. of 80 J/m or more.

24. The molded article of claim 20 wherein the molded article has a Gardner Impact Strength at 23° C. of 22.6 J or more with failure being in ductile mode.

25. The molded article of claim 20 wherein the molded article has an Ultimate Elongation at 23° C. of 1000% or more.

26. The molded article of claim 20 wherein the difference in comonomer content is no greater than 10 weight %.

27. The molded article of claim 20 wherein the intermolecular composition distribution of the semi-amorphous copolymer is 90% or more.

28. The molded article of claim 20 wherein the molded article has a 1% secant flexural modulus at 23° C. of less than 690 MPa.

29. The molded article of claim 20 wherein the blend has a haze of less than 10%.

30. The molded article of claim 20 wherein the blend has a haze of less than 7.5%.

31. The molded article of claim 20 wherein the blend has a haze of less than 6%.

32. The molded article of claim 20 wherein the molded article has a 1% secant flexural modulus at 23° C. of less than 690 MPa, an ultimate elongation at 23° C. of greater than 1000%, a Gardner at both 23° C. and 0° C. of greater than 22.6 J, an Instrumented impact at both 23° C. and 0° C. of greater than 27.1 J.

33. The molded article of claim 20 wherein the molded article has a 1% secant flexural modulus less than 690 MPa, a notched Izod impact strength at 23° C. of greater than 80 J/m, an Instrumented impact at both 23° C. and 0° C. of greater than 27.1 J where failures are all in ductile mode.

34. The molded article of claim 20 wherein the blend has permanent set of 85% or greater.

35. The molded article of claim 20 wherein the blend has permanent set of 150% or greater.

36. The molded article of claim 20 where in the semi-crystalline polymer is a propylene homopolymer.

37. The molded article of claim 20 wherein the semi-amorphous polymer has a heat of fusion of from 10 to 40 J/g.

38. The molded article of claim 20 wherein the semi-crystalline polymer has a melting point of from 125 to 160° C.

39. The molded article of claim 20 wherein the semi-amorphous polymer has a melting point of from 35 to 100° C.

40. A non-woven comprising a homogeneous blend of:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 110 and 170° C., a heat of fusion of at least 80 J/g, and a 1% Secant Flexural Modulus of 100,000 to 250,000 psi, and a melt flow rate of 2000 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more comonomers selected from the group consisting of ethylene, butene, pentene, hexene, heptene, octene, nonene, and decene, said semi-amorphous polymers each having:
a) less than 50 percent crystallinity;
b) a melt flow rate of 2000 dg/min or less;
c) a DSC melting point (second melt Tm) of 100° C. or less;
d) an intermolecular composition distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer and
e) an Mw/Mn of 1.5 to 4,
f) a triad tacticity of three propylene units, as measured by $^{13}$C NMR, of 75% or greater, and
g) a heat of fusion of between 4 and 70 J/g;
where the blend has:
i) a melt flow rate of 1 to 2000 dg/min; and
ii) less than 5 weight % filler, based upon the weight of the polymers and the filler,
iii) a permanent set of greater than 65%; and
iv) a haze of 12% or less measured on a 1 mm thick injection molded chip;
where the non-woven has:
1) a Hand of 40 g or less for 35 g/sm fabrics;
2) an optimum bonding temperature at least 5° C. lower than the optimum bonding temperature for the same nonwoven article made from the same composition except that the semi-amorphous copolymer is absent.

41. The non-woven of claim 40 wherein the nonwoven has a hand on 35 g/sm fabric of 30 g or less.

42. The non-woven of claim 40 wherein the nonwoven has a hand on 35 g/sm fabric of 20 g or less.

43. The non-woven of claim 40 wherein the nonwoven has a hand on 35 g/sm fabric of 15 g or less.

44. The non-woven of claim 40 wherein the nonwoven has an optimum bonding temperature at least 7.5° C. lower than the optimum bonding temperature for the same nonwoven made from the same composition except that the semi-amorphous copolymer is absent.

45. The non-woven of claim 40 wherein the nonwoven has an optimum bonding temperature at least 10° C. lower than the optimum bonding temperature for the same nonwoven made from the same composition except that the semi-amorphous copolymer is absent.

46. The non-woven of claim 40 wherein the nonwoven has an optimum bonding temperature at least 12.5° C. lower than the optimum bonding temperature for the same nonwoven made from the same composition except that the semi-amorphous copolymer is absent.

47. The non-woven of claim 40 wherein the nonwoven has an optimum bonding temperature at least 15° C. lower than the optimum bonding temperature for the same nonwoven made from the same composition except that the semi-amorphous copolymer is absent.

48. The non-woven of claim 40 wherein the nonwoven has an optimum bonding temperature at least 17.5° C. lower than the optimum bonding temperature for the same nonwoven made from the same composition except that the semi-amorphous copolymer is absent.

49. The non-woven of claim 40 wherein the nonwoven has an optimum bonding temperature at least 20° C. lower than the optimum bonding temperature for the same nonwoven made from the same composition except that the semi-amorphous copolymer is absent.

50. The non-woven of claim 40 wherein at 35 g/sm the non-woven has a hand of 30 g or lower and a TD peak tensile load under optimum bonding of 3180 g force or greater.

51. The non-woven of claim 40 wherein the difference in comonomer content is no greater than 10 weight %.

52. The non-woven of claim 40 wherein the intermolecular composition distribution of the semi-amorphous copolymer is 90% or more.

53. The non-woven of claim 40 wherein the intermolecular composition distribution of the semi-amorphous copolymer is 90% or more and the difference in comonomer content is no greater than 10 weight %.

54. The non-woven of claim 40 wherein the blend has a haze of less than 10%.

55. The non-woven of claim 40 wherein the blend has a haze of less than 7.5%.

56. The non-woven of claim 40 wherein the blend has a haze of less than 6%.

57. The non-woven of claim 40 wherein the blend comprises from 1 to 5000 ppm of a slip agent.

58. The non-woven of claim 40 wherein the blend comprises a nucleating agent.

59. The non-woven of claim 40 wherein the blend further comprises nucleating agent selected from the group consisting of adipic acid, benzoic acid, or metal salts of these acids, sorbitols, and 3,4-dimethylbenzylidene sorbitol.

60. A homogeneous polymer blend comprising:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 110 and 160° C., a heat of fusion of at least 80 J/g, and a 1% Secant Flexural Modulus of 100,000 to 250,000 psi, and a melt flow rate of 50 dg/min or less; and 2) from 1 to 40 weight % of one or more semi-amorphous polymers (based upon the weight of the semi-crystalline and semi-amorphous polymers), each semi-amorphous polymer comprising propylene and from 5 to 12 weight % of one or more comonomers, selected from the group consisting of ethylene, butene, pentene, hexene, heptene, octene, nonene, and decene, said semi-amorphous polymers each having:
   a) 8 to 35 percent crystallinity;
   b) a melt flow rate of 1 to 50 dg/min;
   c) a DSC melting point (second melt Tm) of 90° C. or less;
   d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
   e) an Mw/Mn of 1.5 to 4,
   f) a triad tacticity of three propylene units, as measured by $^{13}$C NMR, of 75% or greater,
   g) a heat of fusion of between 4 and 70 J/g, and
3) the blend comprises less than 5 weight % filler, based upon the weight of the polymers and the filler,
where the blend has:
   a) a permanent set of greater than 65%;
   b) a haze of 20% or less; and
   c) a melt flow rate of 1 to 50 dg/min.

61. The composition of claim 60 wherein the difference in comonomer content is no greater than 10 weight %.

62. The composition of claim 60 wherein the blend has a permanent set of 85% or greater.

63. The composition of claim 60 wherein the blend has a permanent set of 100% or greater.

64. The composition of claim 60 wherein the blend has a permanent set of 150% or greater.

65. The composition of claim 60 wherein the blend comprises from 1 to 5000 ppm of a slip agent.

66. The composition of claim 60 wherein the blend comprises a nucleating agent.

67. The composition of claim 60 wherein the semi-crystalline polymer is a propylene homopolymer.

68. The composition of claim 60 wherein the semi-amorphous polymer has a heat of fusion of from 10 to 40 J/g.

69. The composition of claim 60 wherein the semi-amorphous polymer has a melting point of from 35 to 100° C.

70. A film comprising a homogeneous polymer blend comprising:
1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 110 and 160° C., a heat of fusion of at least 80 J/g, and a 1% Secant Flexural Modulus of 100,000 to 250,000 psi, and a melt flow rate of 50 dg/min or less; and
2) from 1 to 40 weight % of one or more semi-amorphous polymers (based upon the weight of the semi-crystalline and semi-amorphous polymers), each semi-amorphous polymer comprising propylene and from 5 to 12 weight % of one or more comonomers selected from the group consisting of ethylene, butene, pentene, hexene, heptene, octene, nonene, and decene, said semi-amorphous polymers each having:
   a) 8 to 35 percent crystallinity;
   b) a melt flow rate of 1 to 50 dg/min;
   c) a DSC melting point (second melt Tm) of 90° C. or less;
   d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
   e) an Mw/Mn of 1.5 to 4,
   f) a triad tacticity of three propylene units, as measured by $^{13}$C NMR, of 75% or greater,
   g) a heat of fusion of between 4 and 70 J/g, and
3) the blend comprises less than 5 weight % filler, based upon the weight of the polymers and the filler,
where the blend has:
   a) a permanent set of greater than 65%;
   b) a haze of 20% or less; and
   c) a melt flow rate of 0.5 to 100 dg/min, and
where the film has:
   1) a thickness of 0.1 to 25 mils (2.5 to 635 microns);
   2) a haze of 20% or less, prior to addition of clarifying or nucleating agents;
   3) a 1% Secant flexural modulus of 860 to 205 MPa;
   4) an Elmendorf tear in the machine direction 1.57 g/micron or more;
   5) an Elmendorf tear in the transverse direction of 1.57 g/micron or more; and
   6) a total energy impact at 23° C. of 2.7 J or more.

71. The film of claim 70 wherein the difference in comonomer content is no greater than 10 weight %.

72. The film of claim 70 wherein the intermolecular composition distribution of the semi-amorphous copolymer is 90% or more.

73. The film of claim 70 wherein the film has a machine direction Elmendorf Tear or 2.16 g/micron or greater.

74. The film of claim 70 wherein the film has a Total energy impact of 4 J or greater.

75. The film of claim 70 wherein the film has a Puncture Energy of 0.12 J/micron or greater.

76. The film of claim 70 wherein the film has a 1% Secant tensile modulus of 518 MPa or lower.

77. The film of claim 70 wherein the film has a haze of 5% or less.

78. The film of claim 70 wherein the film has a 45 degree gloss of 88 units or greater.

79. The film of claim 70 wherein the film has a 1% secant tensile modulus of 690 MPa or less, an MD Elmendorf Tear of 1.77 g/micron or more, a haze or 2% or lower, a 45 degree gloss of 88 units or higher, and a Total energy impact at 23° C. of 4 J or greater.

80. The film of claim 70 wherein the film has a 1% secant tensile modulus of 518 MPa or lower, an MD Elmendorf tear of 2.16 g/microns or greater, a haze of 2% or lower, a 45 degree gloss of 88 units or higher, and a Total energy impact at 23° C. of 4.75 J or greater.

81. The film of claim 70 wherein the blend has a permanent set of 85% or greater.

82. The film of claim 70 wherein the blend has a permanent set of 100% or greater.

83. The film of claim 70 wherein the blend has a permanent set of 150% or greater.

84. The film of claim 70 wherein the blend comprises from 1 to 5000 ppm of a slip agent.

85. The film of claim 70 wherein the blend comprises a nucleating agent.

86. The film of claim 70 wherein the semi-crystalline polymer comprises propylene and from 1 to 3 weight % of one or more comonomers selected from the group consisting of ethylene, butene, pentene, hexene, heptene, octene, nonene, and decene.

87. The film of claim 70 wherein the semi-crystalline polymer is a propylene homopolymer.

88. The film of claim 70 wherein the semi-amorphous polymer has a heat of fusion of from 10 to 40 J/g.

89. The film of claim 70 wherein the semi-amorphous polymer has a melting point of from 35 to 100° C.

90. A fiber comprising a homogeneous polymer blend comprising:
  1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 110 and 160° C., a heat of fusion of at least 80 J/g, and a 1% Secant Flexural Modulus of 100,000 to 250,000 psi, and a melt flow rate of 50 dg/min or less; and
  2) from 1 to 40 weight % of one or more semi-amorphous polymers (based upon the weight of the semi-crystalline and semi-amorphous polymers), each semi-amorphous polymer comprising propylene and from 5 to 12% of one or more comonomers selected from the group consisting of ethylene, butene, pentene, hexene, heptene, octene, nonene, and decene, said semi-amorphous polymers each having:
    a) 8 to 35 percent crystallinity;
    b) a melt flow rate of 1 to 50 dg/min;
    c) a DSC melting point (second melt Tm) of 90° C. or less;
    d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer;
    e) an Mw/Mn of 1.5 to 4; and
    f) a triad tacticity of three propylene units, as measured by $^{13}$C NMR, of 75% or greater,
    g) a heat of fusion of between 4 and 70 J/g;
  where the blend:
    1) comprises less than 5 weight % filler, based upon the weight of the polymers and the filler;
    2) has a permanent set of greater than 65%;
    3) has a haze of 20% or less; and
    4) has a melt flow rate of from 1 to 50 dg/min, and
  where the fiber has:
    1) a Hand of 40 g or less when converted into spunbond fabric of 35 g/sm fabrics basis weight.

91. A non-woven comprising a homogeneous polymer blend comprising:
  1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 110 and 160° C., a heat of fusion of at least 80 J/g, and a 1% Secant Flexural Modulus of 100,000 to 250,000 psi, and a melt flow rate of 50 dg/min or less; and
  2) from 1 to 40 weight % of one or more semi-amorphous polymers (based upon the weight of the semi-crystalline and semi-amorphous polymers), each semi-amorphous polymer comprising propylene and from 5 to 12 weight % of one or more comonomers selected from the group consisting of ethylene, butene, pentene, hexene, heptene, octene, nonene, and decene, said semi-amorphous polymers each having:
    a) 8 to 35 percent crystallinity;
    b) a melt flow rate of 1 to 50 dg/min;
    c) a DSC melting point (second melt Tm) of 90° C. or less;
    d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
    e) an Mw/Mn of 1.5 to 4,
    f) a triad tacticity of three propylene units, as measured by $^{13}$C NMR, of 75% or greater,
    g) a heat of fusion of between 4 and 70 J/g, and
  3) the blend comprises less than 5 weight % filler, based upon the weight of the polymers and the filler,
  where the blend has:
    a) a permanent set of greater than 65%;
    b) a haze of 20% or less; and
    c) a melt flow rate of 1 to 2000 dg/min, and
  and where the non-woven has:
    1) a Hand of 40 g or less for 35 g/sm fabrics;
    2) an optimum bonding temperature at least 5° C. lower than the optimum bonding temperature for the same nonwoven article made from the same composition except that the semi-amorphous copolymer is absent.

92. The non-woven of claim 91 wherein the nonwoven has a hand on 35 g/sm fabric of 30 g or less.

93. The non-woven of claim 91 wherein the nonwoven has a hand on 35 g/sm fabric of 20 g or less.

94. The non-woven of claim 91 wherein the nonwoven has a hand on 35 g/sm fabric of 15 g or less.

95. The non-woven of claim 91 wherein the nonwoven has an optimum bonding temperature at least 7.5° C. lower than the optimum bonding temperature for the same nonwoven made from the same composition except that the semi-amorphous copolymer is absent.

96. The non-woven of claim 91 wherein the nonwoven has an optimum bonding temperature at least 10° C. lower than the optimum bonding temperature for the same nonwoven made from the same composition except that the semi-amorphous copolymer is absent.

97. The non-woven of claim 91 wherein the nonwoven has an optimum bonding temperature at least 12.5° C. lower than the optimum bonding temperature for the same nonwoven made from the same composition except that the semi-amorphous copolymer is absent.

98. The non-woven of claim 91 wherein the nonwoven has an optimum bonding temperature at least 15° C. lower than the optimum bonding temperature for the same nonwoven made from the same composition except that the semi-amorphous copolymer is absent.

99. The non-woven of claim 91 wherein the nonwoven has an optimum bonding temperature at least 17.5° C. lower than the optimum bonding temperature for the same nonwoven made from the same composition except that the semi-amorphous copolymer is absent.

100. The non-woven of claim 91 wherein the nonwoven has an optimum bonding temperature at least 20° C. lower than the optimum bonding temperature for the same nonwoven made from the same composition except that the semi-amorphous copolymer is absent.

101. The non-woven of claim 91 wherein at 35 g/sm the non-woven has a hand of 30 g or lower and a TD peak tensile load under optimum bonding of 3180 g force or greater.

102. The non-woven of claim 91 wherein the difference in comonomer content is no greater than 10 weight %.

103. The non-woven of claim 91 wherein the intermolecular composition distribution of the semi-amorphous copolymer is 90% or more.

104. The non-woven of claim 91 wherein the intermolecular composition distribution of the semi-amorphous copolymer is 90% or more and the difference in comonomer content is no greater than 10 weight %.

105. The non-woven of claim 91 wherein the blend has a haze of less than 10%.

106. The non-woven of claim 91 wherein the blend has a haze of less than 7.5%.

107. The non-woven of claim 91 wherein the blend has a haze of less than 6%.

108. The non-woven of claim 91 wherein the blend comprises from 1 to 5000 ppm of a slip agent.

109. The non-woven of claim 91 wherein the blend comprises a nucleating agent selected from the group consisting of adipic acid, benzoic acid, or metal salts of these acids, sorbitols, and 3,4-dimethylbenzylidene sorbitol.

110. A molded article comprising a homogeneous polymer blend comprising:
   1) from 60 to 99 weight percent of one or more semi-crystalline polymers (based upon the weight of the semi-crystalline and semi-amorphous polymers), each semi-crystalline polymer comprising propylene and from 0 to 5 weight % alpha-olefin comonomer (based upon the weight of the polymer), said semi-crystalline polymers each having a melting point between 100 and 160° C., a heat of fusion of at least 80 J/g, and a 1% Secant Flexural Modulus of 100,000 to 250,000 psi, and a melt flow rate of 50 dg/min or less; and
   2) from 1 to 40 weight % of one or more semi-amorphous polymers (based upon the weight of the semi-crystalline and semi-amorphous polymers), each semi-amorphous polymer comprising propylene and from 5 to 12 weight % of one or more comonomers, selected from the group consisting of ethylene, butene, pentene, hexene, heptene, octene, nonene, and decene, said semi-amorphous polymers each having:
      a) 8 to 35 percent crystallinity;
      b) a melt flow rate of 1 to 50 dg/min;
      c) a DSC melting point (second melt Tm) of 90° C. or less;
      d) an intermolecular composition distribution compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and
      e) an Mw/Mn of 1.5 to 4,
      f) a triad tacticity of three propylene units, as measured by $^{13}$C NMR, of 75% or greater,
      g) a heat of fusion of between 4 and 70 J/g, and
   3) the blend comprises less than 5 weight % filler, based upon the weight of the polymers and the filler,
where the blend has:
   i) a melt flow rate of 0.5 to 200 dg/min; and
   ii) a permanent set of greater than 65%; and
   iii) a haze of 12% or less measured on a 1 mm thick injection molded chip; and
   iv) optionally, a heat deflection temperature of 45° C. or more,
where the molded article has:
   1) a thickness of 250 µm to 10 mm;
   2) a 1% Secant Flexural Modulus at 23° C. of 1035 MPa or less;
   3) a Gardner Impact Strength at 23° C. of 11.3 J or more; and
   4) a Gardner Impact Strength at 0° C. of 5.6 J or more.

111. The molded article of claim 110 wherein the molded article has a Notched Izod Impact Strength at 23° C. of 53 J/m or more.

112. The molded article of claim 110 wherein the molded article has a Gardner Impact Strength at 23° C. of 22.6 J or more.

113. The molded article of claim 110 wherein the molded article has a Notched Izod Impact Strength at 23° C. of 80 J/m or more.

114. The molded article of claim 110 wherein the molded article has a Gardner Impact Strength at 23° C. of 22.6 J or more with failure being in ductile mode.

115. The molded article of claim 110 wherein the molded article has an Ultimate Elongation at 23° C. of 1000% or more.

116. The molded article of claim 110 wherein the difference in comonomer content is no greater than 10 weight %.

117. The molded article of claim 110 wherein the intermolecular composition distribution of the semi-amorphous copolymer is 90% or more.

118. The molded article of claim 110 wherein the molded article has a 1% secant flexural modulus at 23° C. of less than 690 MPa.

119. The molded article of claim 110 wherein the blend has a haze of less than 10%.

120. The molded article of claim 110 wherein the blend has a haze of less than 7.5%.

121. The molded article of claim 110 wherein the blend has a haze of less than 6%.

122. The molded article of claim 110 wherein the molded article has a 1% secant flexural modulus at 23° C. of less than 690 MPa, an ultimate elongation at 23° C. of greater than 1000%, a Gardner at both 23° C. and 0° C. of greater than 22.6 J, an Instrumented impact at both 23° C. and 0° C. of greater than 27.1 J.

123. The molded article of claim 110 wherein the molded article has a 1% secant flexural modulus less than 690 MPa, a notched Izod impact strength at 23° C. of greater than 80 J/m, an Instrumented impact at both 23° C. and 0° C. of greater than 27.1 J where failures are all in ductile mode.

124. The molded article of claim 110 wherein the blend has permanent set of 85% or greater.

125. The molded article of claim 110 wherein the blend has permanent set of 100% or greater.

126. The molded article of claim 110 wherein the blend has permanent set of 125% or greater.

127. The molded article of claim 110 wherein the blend has permanent set of 150% or greater.

128. The molded article of claim 110 where in the semi-crystalline polymer is a propylene homopolymer.

129. The molded article of claim 110 wherein the semi-amorphous polymer has a heat of fusion of from 10 to 40 J/g.

130. The molded article of claim 110 wherein the semi-crystalline polymer has a melting point of from 125 to 160° C.

131. The molded article of claim 110 wherein the semi-amorphous polymer has a melting point of from 35 to 100° C.

132. The composition of claim 1 wherein the intermolecular composition distribution of the semi-amorphous copolymer is 90% or more and the difference in comonomer content is no greater than 10 weight %.

133. The composition of claim 1 wherein the semi-crystalline polymer is a homopolymer.

134. The non-woven of claim 40 wherein the semi-crystalline polymer is a hompolymer.

135. The composition of claim 60 wherein the intermolecular composition distribution of the semi-amorphous copolymer is 90% or more.

136. The composition of claim 60 wherein the intermolecular composition distribution of the semi-amorphous copolymer is 90% or more and the difference in comonomer content is no greater than 10 weight %.

137. The film of claim 70 wherein the intermolecular composition distribution of the semi-amorphous copolymer is 90% or more and the difference in comonomer content is no greater than 10 weight %.

138. The film of claim 70 wherein the film has a haze of 2% or less.

139. The film of claim 70 wherein the film has a haze of 1% or less.

140. The non-woven of claim 91 wherein the semi-crystalline polymer is a homopolymer.

141. The molded article of claim 110 wherein the intermolecular composition distribution of the semi-amorphous copolymer is 90% or more and the difference in comonomer content is no greater than 10 weight %.

142. The composition of claim 60 wherein the semi-crystalline polymer comprises propylene and from 1 to 3 weight % of one or more comonomers selected from the group consisting of ethylene, butene, pentene, hexene, heptene, octene, nonene, and decene.

* * * * *

UNITED STATES PATENT AND TRADEMARK OFFICE
CERTIFICATE OF CORRECTION

PATENT NO. : 7,619,038 B2
APPLICATION NO. : 11/299022
DATED : November 17, 2009
INVENTOR(S) : Mehta et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this

Twenty-sixth Day of October, 2010

David J. Kappos
*Director of the United States Patent and Trademark Office*